United States Patent
Nakazawa et al.

(10) Patent No.: US 12,360,416 B2
(45) Date of Patent: Jul. 15, 2025

(54) COLOR FILTER SUBSTRATE, DISPLAY DEVICE, AND METHOD OF PRODUCING COLOR FILTER SUBSTRATE

(71) Applicant: Sharp Display Technology Corporation, Kameyama (JP)

(72) Inventors: Makoto Nakazawa, Kameyama (JP); Keisuke Yoshida, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/792,883

(22) Filed: Aug. 2, 2024

(65) Prior Publication Data

US 2025/0116898 A1    Apr. 10, 2025

(30) Foreign Application Priority Data

Oct. 4, 2023   (JP) ................. 2023-172495

(51) Int. Cl.
*G02F 1/1335*   (2006.01)
*G02B 27/01*    (2006.01)

(52) U.S. Cl.
CPC ... *G02F 1/133516* (2013.01); *G02B 27/0172* (2013.01); *G02F 1/133512* (2013.01)

(58) Field of Classification Search
CPC ......... G02F 1/133516; G02F 1/133512; G02B 27/0172
See application file for complete search history.

(56) References Cited

U.S. PATENT DOCUMENTS

2017/0090245 A1*   3/2017   Tsuchiya ............ H10K 59/8792

FOREIGN PATENT DOCUMENTS

| JP | H10-153704 A | 6/1998 |
| JP | 2008-066339 A | 3/2008 |
| JP | 2009-237322 A | 10/2009 |
| JP | 2019-120768 A | 7/2019 |
| JP | 2019-179111 A | 10/2019 |

* cited by examiner

*Primary Examiner* — Anne M Hines
*Assistant Examiner* — Jose M Diaz
(74) *Attorney, Agent, or Firm* — ScienBiziP, P.C.

(57) ABSTRACT

A color filter substrate includes first and second color filters exhibiting different colors and a light blocking portion. The light blocking portion includes a first transmissive film, a first reflective film on an upper layer side of the first transmissive film, a second transmissive film on an upper layer side of the first reflective film, and a second reflective film on an upper layer side of the second transmissive film and being thicker than the first reflective film. The first transmissive film includes a first bottom surface and a first side surface being inclined at a first angle with respect to the first bottom surface. The second reflective film includes a second bottom surface extending parallel to the first bottom surface and a second side surface being inclined at a second angle with respect to the second bottom surface. The first angle and the second angle are acute angles.

9 Claims, 17 Drawing Sheets

FIG.15

| COMPARATIVE EXAMPLE 2 ||
|---|---|
| IMAGE | |
| SIXTH ANGLE | 50° |
| DETERMINATION RESULT | NOT GOOD |

FIG.16

| COMPARATIVE EXAMPLE 3 ||
|---|---|
| IMAGE | |
| SIXTH ANGLE | 47° |
| DETERMINATION RESULT | FAILED |

FIG.17

| COMPARATIVE EXAMPLE 4 ||
|---|---|
| IMAGE | |
| SIXTH ANGLE | 64° |
| DETERMINATION RESULT | NOT GOOD |

FIG.18

| EXAMPLE 1 ||
|---|---|
| IMAGE | |
| SIXTH ANGLE | 74° |
| DETERMINATION RESULT | GOOD |

COLOR FILTER SUBSTRATE, DISPLAY DEVICE, AND METHOD OF PRODUCING COLOR FILTER SUBSTRATE

CROSS REFERENCE TO RELATED APPLICATION

This application claims priority from Japanese Patent Application No. 2023-172495 filed on Oct. 4, 2023. The entire contents of the priority application are incorporated herein by reference.

TECHNICAL FIELD

The present technology described herein relates to a color filter substrate, a display device, and a method producing a color filter substrate.

BACKGROUND

A color filter substrate included in an image display panel such as a liquid crystal panel has been known. One example of such a color filter includes a photosensitive composition containing a light blocking agent. In such a photosensitive composition, an oxime ester compound with a specific structure is used as a photoinitiator, and a resin coated carbon black is used as the light blocking agent.

SUMMARY

In the above color filter substrate, resin material is used as a material of the black matrix. Therefore, with the image display panel having quite high precision and the pixel density being 1000 ppi or higher (particularly, 1200 ppi or higher), effective exposure precision cannot be obtained when the black matrix is exposed with light using an exposing device. Therefore, miniaturization of the black matrix is difficult.

The technology described herein was made in view of the above circumstances. An object is to achieve miniaturization of a light blocking portion.

(1) A color filter substrate according to the technology described herein includes a first color filter, a second color filter exhibiting a color different from a color exhibited by the first color filter, and a light blocking portion disposed on a border between the first color filter and the second color filter and on a lower layer side of the first color filter and the second color filter. The light blocking portion includes a first transmissive film, a first reflective film disposed on an upper layer side of the first transmissive film, a second transmissive film disposed on an upper layer side of the first reflective film, and a second reflective film disposed on an upper layer side of the second transmissive film and having a thickness greater than a thickness of the first reflective film. The first transmissive film includes a first bottom surface that is on an opposite side from the first reflective film and a first side surface that is inclined at a first angle with respect to the first bottom surface. The second reflective film includes a second bottom surface that is contacted with an upper surface of the second transmissive film and extends parallel to the first bottom surface and a second side surface that is inclined at a second angle with respect to the second bottom surface. The first angle and the second angle are acute angles.

(2) In the color filter substrate, in addition to (1), the first reflective film may include a third bottom surface that is contacted with an upper surface of the first transmissive film and extends parallel to the first bottom surface and a third side surface, and a third angle may be formed between the third side surface and the third bottom surface. The second transmissive film may include a fourth bottom surface that is contacted with an upper surface of the first reflective film and extends parallel to the first bottom surface and a fourth side surface, and a fourth angle may be formed between the fourth side surface and the fourth bottom surface. The first reflective film may be configured such that the third side surface is contacted with the upper surface of the first transmissive film without being contacted with the first side surface.

(3) In the color filter substrate, in addition to (2), the third angle and the fourth angle may be greater than the first angle.

(4) In the color filter substrate, in addition to (2) or (3), the second reflective film may include a fifth side surface that is contacted with the second bottom surface and a fifth angle may be formed between the fifth side surface and the second bottom surface and the fifth angle may be an obtuse angle.

(5) In the color filter substrate, in addition to any one of (1) to (4), the light blocking portion may be configured such that an angle formed between the first bottom surface and a segment that extends from an outer edge of the first transmissive film to an outer edge of the second reflective film is from 70° to 90°.

(6) A display device according to the technology described herein includes the color filter substrate described any one of (1) to (5) and an array substrate disposed to opposite the color filter substrate.

(7) A method of producing a color filter substrate according to the technology described herein includes depositing a first transmissive film on a substrate, depositing a first reflective film on an upper layer side of the first transmissive film, depositing a second transmissive film on an upper layer side of the first reflective film, depositing a second reflective film on an upper layer side of the second transmissive film, the second reflective film being thicker than the first reflective film, depositing a resist film having photosensitive properties on an upper layer side of the second reflective film, exposing the resist film with light to perform development, performing first etching in which at least the second reflective film is subjected to etching with using the resist film as a mask, performing second etching in which the second reflective film, the second transmissive film, the first reflective film, and the first transmissive film are subjected to etching with using the resist film as a mask at an etching speed that is lower than an etching speed of the first etching, whereby forming a light blocking portion including the first transmissive film, the first reflective film, the second transmissive film, and the second reflective film, forming a first color filter such that an edge portion of the first color filter is disposed on an upper layer side of the light blocking portion, and forming a second color filter next to the first color filter such that an edge portion of the second color filter is disposed on an upper layer side of the light blocking portion, the second color filter exhibiting a color different from a color that is exhibited by the first color filter.

(8) In the method of producing a color filter substrate, in addition to (7), in the first etching, at least $SF_6$ gas may be used, and in the second etching, at least $CF_4$ gas and $O_2$ gas may be used.

(9) In the method of producing a color filter substrate, in addition to (7) or (8), in the first etching and the second etching, an etching device may be used, the etching device including a vacuum chamber in which the substrate is arranged, and a substrate support base arranged in the vacuum chamber and including protrusions that are arranged at intervals within a surface area of the substrate and support the substrate.

According to the technology described herein, miniaturization of a light blocking portion can be achieved.

BRIEF DESCRIPTION OF THE DRAWINGS

FIG. 15 is a table illustrating an experiment result of Comparative Example 2 of Comparative Experiment 1 according to the embodiment.

FIG. 16 is a table illustrating an experiment result of Comparative Example 3 of Comparative Experiment 1 according to the embodiment.

FIG. 17 is a table illustrating an experiment result of Comparative Example 4 of Comparative Experiment 1 according to the embodiment.

FIG. 18 is a table illustrating an experiment result of Example 1 of Comparative Experiment 1 according to the embodiment.

DETAILED DESCRIPTION

Figure 1:
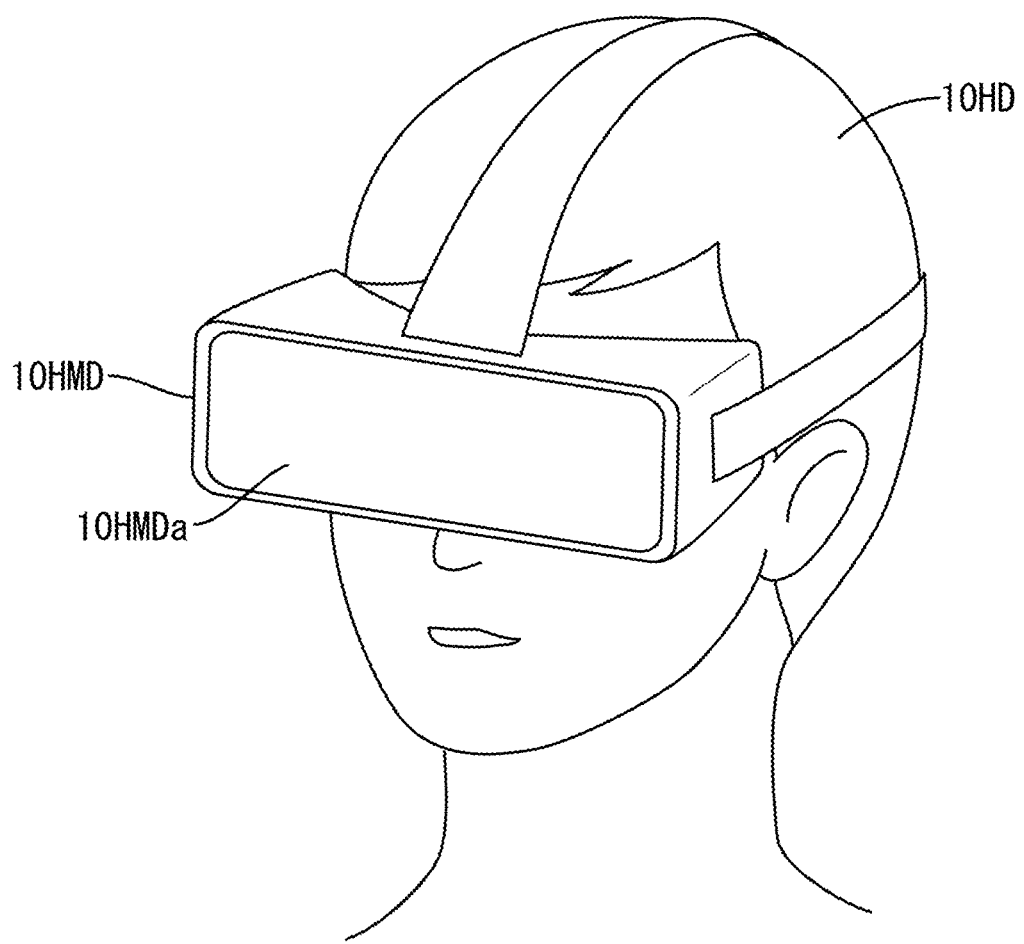
FIG. 1 is a general perspective view illustrating a head-mounted display that is mounted on a head of a user according to one embodiment.

One embodiment will be described with reference to FIGS. 1 to 24. In this embodiment section, a goggle-type head-mounted display (HMD) 10HMD and a liquid crystal display device 10 (a display device) used therein will be described as an example. X-axis, Y-axis and Z-axis may be present in the drawings and each of the axial directions represents a direction represented in each drawing.

An outer appearance of the goggle-type head-mounted display 10HMD will be described with reference to FIG. 1. As illustrated in FIG. 1, the goggle-type head-mounted display 10HMD includes a head mounting device 10HMDa that is to be mounted on the head 10HD of the user. The head mounting device 10HMDa covers the eyes of the user.

Figure 2:
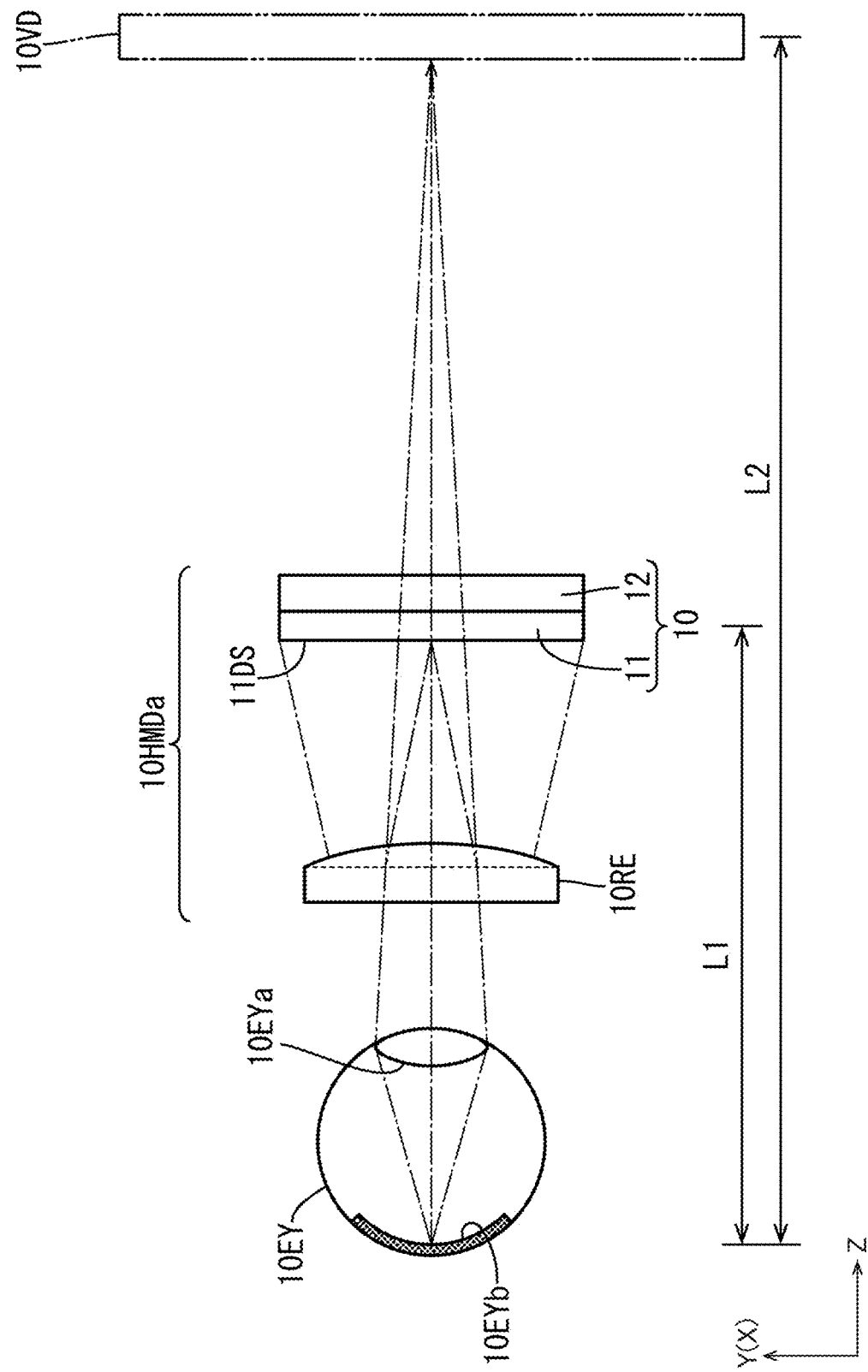
FIG. 2 is a general side view illustrating an optical relation of a liquid crystal display device and a lens that are included in a head mounting device of the head-mounted display according to the embodiment and an eyeball of the user.

A configuration of the head mounting device 10HMDa will be described with reference to FIG. 2. As illustrated in FIG. 2, the head mounting device 10HMDa at least includes the liquid crystal display device 10 displaying images thereon and a lens 10RE with which the images displayed on the liquid crystal display device 10 are formed (imaging) on the eyeballs EY of the user. The liquid crystal display device 10 at least includes a liquid crystal panel 11 (a display device) and a backlight 12 (a lighting device) that supplies light to the liquid crystal panel 11. The liquid crystal panel 11 includes a plate surface that is opposed to the lens 10RE as a display surface 11DS on which images are displayed. The lens 10RE is disposed between the liquid crystal display device 10 and the eyeballs 10EY of the user and makes the light rays transmitting therethrough to be refracted. By adjusting a focal distance of the lens 10RE, images formed on the retina (eye) 10EYb through the crystalline lens 10EYa of the eyeball 10EY can be seen by a user as if the images are displayed on a virtual display 10VD that is present in appearance at a position away from the eyeball 10EY by a distance L2. The distance L2 is much greater than an actual distance L1 from the eyeball 10EY to the liquid crystal display device 10. Accordingly, the user sees a magnified image (a virtual image) displayed on the virtual display 10VD having a screen size (for example, from dozens of inches to several hundred inches) much greater than the screen size (for example, from several numbers of 0.1 inches to several inches) of the liquid crystal display device 10.

One liquid crystal display device 10 may be mounted in the head mounting device 10HMDa and images for a right eye and images for a left eye may be displayed on the liquid crystal display device 10. Two liquid crystal display devices 10 may be mounted in the head mounting device 10HMDa and images for a right eye may be displayed on one of the two liquid crystal display devices 10 and images for a left eye may be displayed on the other one of the two liquid crystal display devices 10. The head mounting device 10HMDa may include earphone that is put on user's ears and through which sounds are output.

Figure 3:
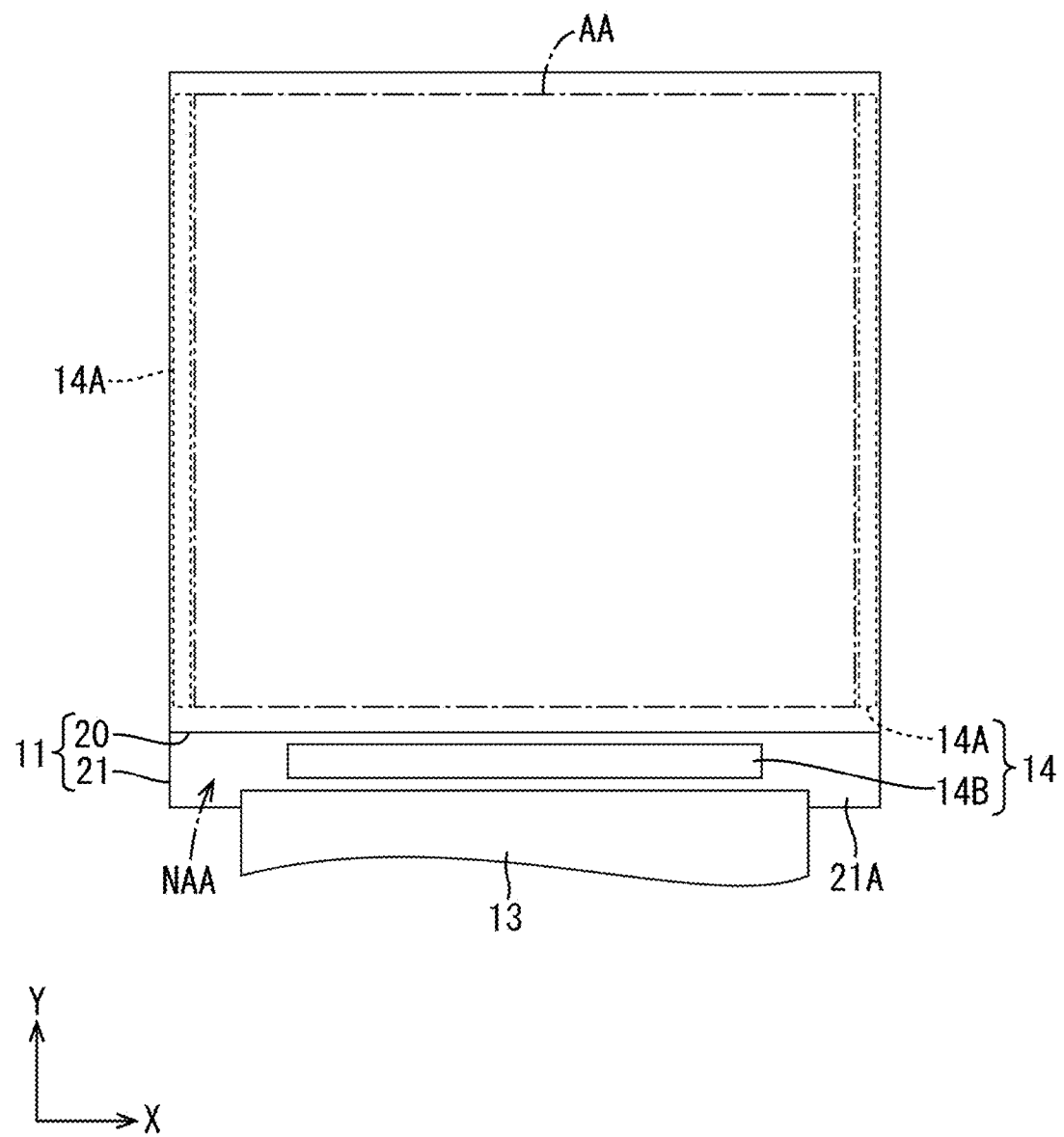
FIG. 3 is a plan view illustrating a liquid crystal panel and a flexible board included in the liquid crystal display device according to the embodiment.

A configuration of the liquid crystal panel 11 included in the liquid crystal display device 10 will be described with reference to FIG. 3. The backlight 12 has a known configuration and includes a light source such as LEDs and optical members for converting the light from the light source into planar light by adding optical effects to the light from the light source. As illustrated in FIG. 3, the liquid crystal panel 11 has a rectangular plan view shape as a whole. A middle section of a screen of the liquid crystal panel 11 is configured as a display area AA in which images are displayed. An outer section in a frame shape surrounding the display area AA in the screen of the liquid crystal panel 11 is configured as a non-display area NAA in which images are not displayed. In FIG. 3, an area defined by a long-dashed short-dashed line is the display area AA. The liquid crystal panel 11 of this embodiment, which is used for the head-mounted display 10HMD, has quite high precision and the pixel density is about 1000 ppi or higher, and particularly, 1200 ppi or higher.

As illustrated in FIG. 3, the liquid crystal panel 11 includes a pair of substrates 20, 21 that are bonded to each other. One of the substrates 20, 21 on the front side is a color filter substrate 20 (an opposed substrate, a CF substrate) and another one on the back side is an array substrate 21 (an active matrix substrate). The color filter substrate 20 and the array substrate 21 include substantially transparent glass substrates 20GS, 21GS having high light transmissive properties and various films formed in layers on inner sides of the glass substrates 20GS, 21GS. The glass substrate 20GS, 21Gs includes alkali-free glass as main material. The array substrate 21 is larger than the color filter substrate 20. A projecting portion 21A, which is an edge portion of the array substrate 21, projects from a corresponding edge of the color filter substrate 20. A flexible board 13 is mounted on the projecting portion 21A of the array substrate 21. The flexible board 13 includes a substrate having insulating properties and flexibility and multiple traces formed on the substrate. One edge of the flexible board 13 is connected to the array substrate 21 and other edge of the flexible board 13 is connected to an external control board (a signal supply). Various kinds of signals supplied from the control board are transferred to the liquid crystal panel 11 via the flexible board 13.

As illustrated in FIG. 3, a circuit 14 (a surrounding circuit) is mounted on the non-display area NAA of the liquid crystal panel 11. The circuit 14 includes a pair of first circuits 14A and a second circuit 14B. The pair of first circuits 14A are disposed to sandwich the display area AA with respect to the X-axis direction. The first circuit 14A is disposed in a belt-shaped area extending along the Y-axis direction. The first circuits 14A are for supplying scan signals to gate lines 25, which will be described later, and are monolithically fabricated on the array substrate 21. The first circuit 14A is a gate driver monolithic (GDM) circuit. The first circuit 14A includes a shift resistor circuit that is configured to output scan signals at predetermined timing and a buffer circuit that is configured to amplify scan signals. The second circuit 14B is disposed in an area between the display area AA and the flexible board 13 with respect to the Y-axis direction. The second circuit 14B is disposed in a belt-shaped area extending along the X-axis direction. The second circuit 14B is for supplying image signals (data signals) to source lines 26, which will be described later, and is monolithically fabricated on the array substrate 21. The second circuit 14B includes a source shared driving (SSD) circuit. The second circuit 14B is configured as a switching component that distributes the image signals supplied from the flexible board 13 to the source lines 26.

Figure 4:
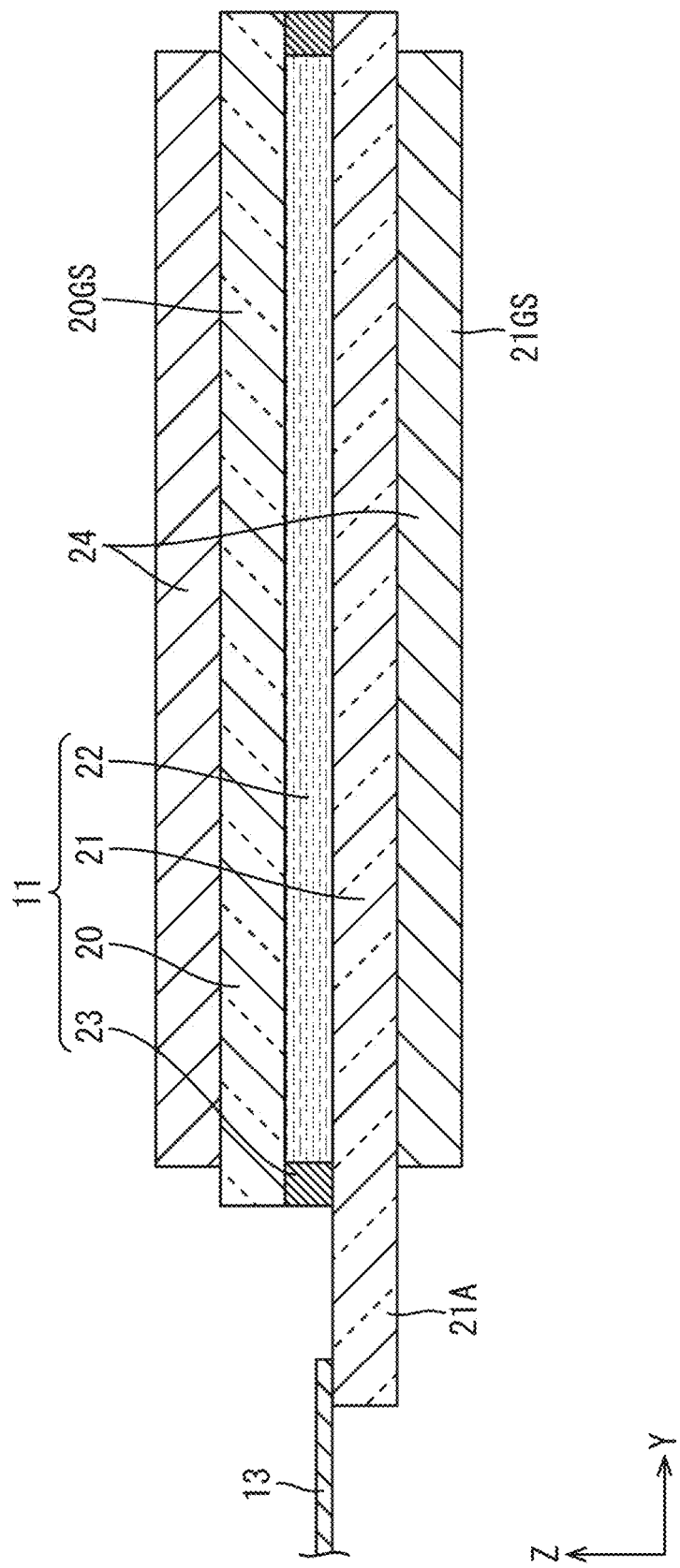
FIG. 4 is a cross-sectional view of the liquid crystal panel according to the embodiment.

Next, a cross-sectional configuration of the liquid crystal panel 11 will be described with reference to FIG. 4. As illustrated in FIG. 4, the substrates 20, 21 are disposed opposite each other with having a space therebetween with respect to a normal direction to main surfaces of the substrates 20, 21. At least a liquid crystal layer 22 and a sealing portion 23 that seals the liquid crystal layer 22 are disposed between the substrates 20, 21. The liquid crystal layer 22 includes liquid crystal molecules that are substances having optical characteristics that change according to application of an electric field. The sealing portion 23 has a rectangular frame plan view shape (endless loop shape) as a whole and surrounds the entire periphery of the liquid crystal layer 22 in the non-display area NAA. The sealing portion 23 keeps the gap (a cell gap) corresponding to the thickness of the liquid crystal layer 22. Polarizing plates 24 are bonded to outer surfaces of the substrates 20, 21, respectively.

Figure 5:
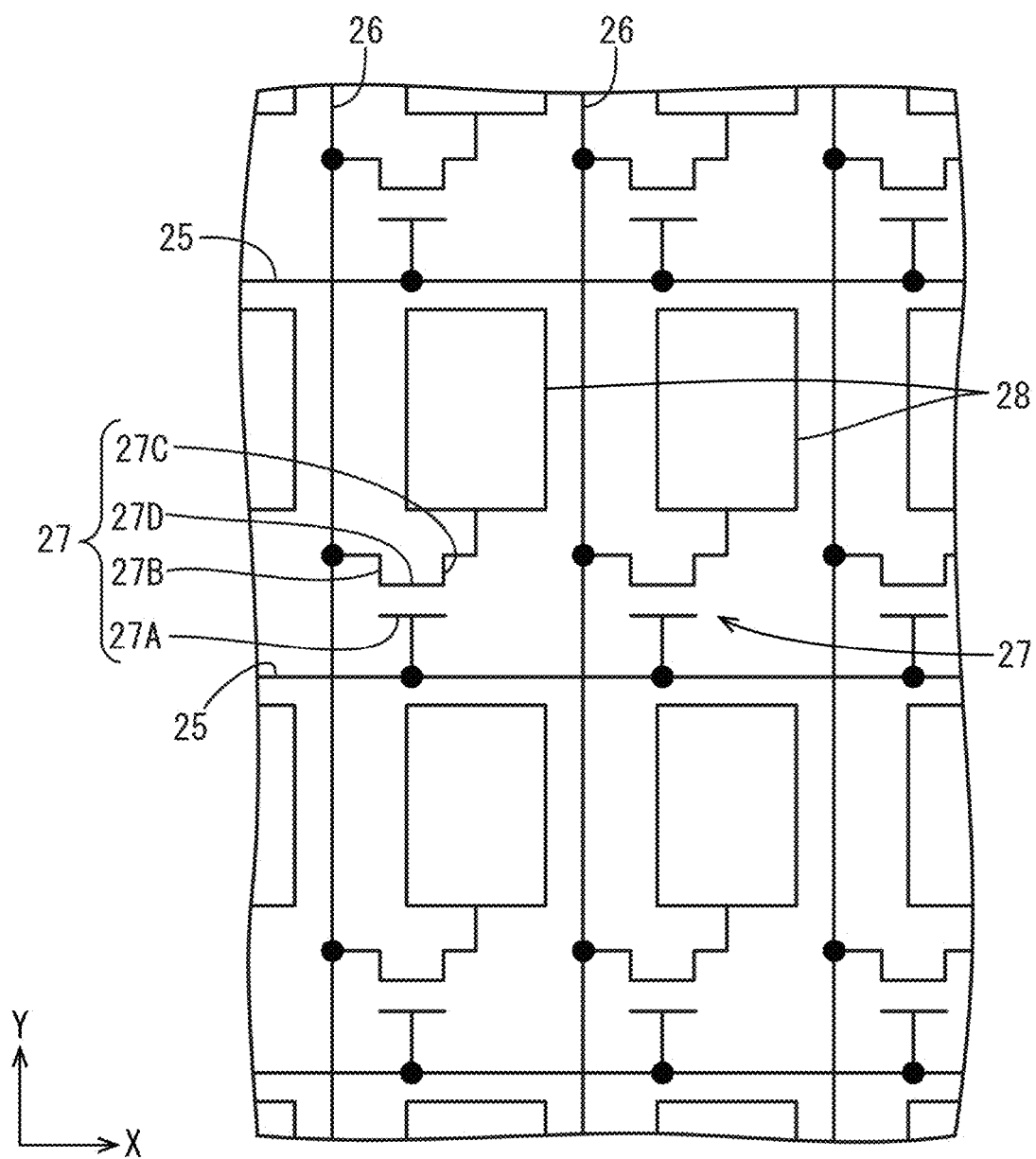
FIG. 5 is a circuit diagram illustrating pixel arrangement in the display area of an array substrate included in the liquid crystal panel according to the embodiment.

Pixel arrangement in the display area AA of the array substrate 21 will be described with reference to FIG. 5. As illustrated in FIG. 5, gate lines 25 (scanning lines) and source lines 26 (image lines) are routed in a grid in an area of the inner surface of the array substrate 21 in the display area AA. The gate lines 25 extend along the X-axis direction and cross the display area AA laterally. The gate lines 25 are arranged at intervals in the Y-axis direction. The gate lines 25 are supplied with the scan signals that are output from the first circuit 14A. The source lines 26 extend along the Y-axis direction and cross the display area AA vertically. The source lines 26 and the gate lines 25 cross each other. The source lines 26 are arranged at intervals in the X-axis direction. The image signals output from the second circuit 14B are supplied to the source lines 26. TFTS 27 (switching components) and pixel electrodes 28 are arranged in areas near the crossing portions where the gate lines 25 and the source lines 26 cross. The TFTs 27 and the pixel electrodes 28 are arranged regularly along the X-axis direction and the Y-axis direction. The TFT 27 is connected to the gate line 25, the source line 26, and the pixel electrode 28. The TFTs 27 include gate electrodes 27A, source electrodes 27B, drain electrodes 27C, and semiconductor sections 27D. The gate electrodes 27A are connected to the gate lines 25, respectively. The source electrodes 27B are connected to the source lines 26, respectively. The drain electrodes 27C are connected to the pixel electrodes 28, respectively. The semiconductor section 27D is connected to the source electrode 27B and the drain electrode 27C. The semiconductor sections 27D are made of semiconductor material and overlap the gate electrodes 27A, respectively. The TFTs 27 turn on based on the scanning signals supplied to the gate electrodes 27A via the gate lines 25. Then, the pixel electrodes 28 are charged at potentials related to the image signals supplied to the source electrodes 27B via the source lines 26. The pixel electrodes 28 have a long shape elongated in the Y-axis direction.

Figure 6:
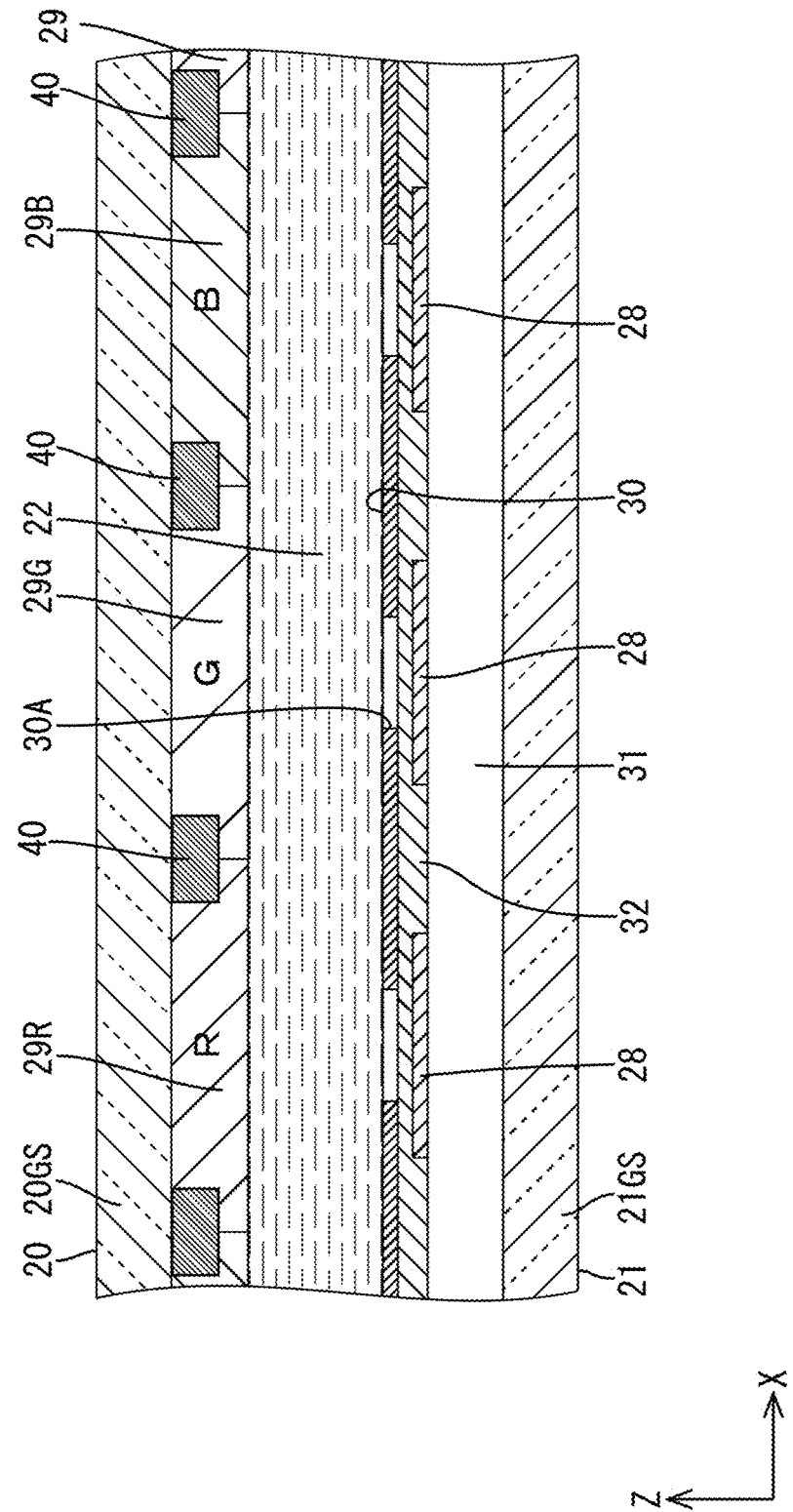
FIG. 6 is a cross-sectional view of the liquid crystal panel according to the embodiment illustrating pixel arrangement in the display area of the liquid crystal panel according to the embodiment.

Inner surface side configurations of the color filter substrate 20 and the array substrate 21 included in the display area AA will be described with reference to FIG. 6. As illustrated in FIG. 6, a common electrode 30, a pixel circuit 31, and alignment film are disposed in the display area AA on an inner surface side of the array substrate 21. The pixel circuit 31 includes the gate lines 25, the source lines 26, and the TFTs 27 and is configured to supply a predefined potential to the pixel electrodes 28 at predefined timing. The common electrode 30 is included in an upper layer than the pixel electrodes 28 and spreads over substantially an entire area of the display area AA. Therefore, the common electrode 30 is disposed to overlap all the pixel electrodes 28 arranged in the display area AA. In the array substrate 21 of this embodiment, with respect to the pixel electrode 28 and the common electrode 30, the common electrode 30 that is included in the upper layer is defined as the upper electrode and the pixel electrode 28 that is included in the lower layer is defined as the lower electrode. An insulation film 32 is disposed between the pixel electrodes 28 and the common electrode 30. The common electrode 30 includes slits 30A in portions overlapping the pixel electrodes 28, respectively. The common electrode 30 is supplied with common potential signals of a common potential (a reference potential) from the pixel circuit 31. When the pixel electrode 28 is charged at a potential based on the image signal transmitted to the source line 26 according to the driving of the TFT 27, a potential difference occurs between the pixel electrode 28 and the common electrode 30. Then, a fringe electric field (an oblique electric field) is created between an opening edge of the slit 30A in the common electrode 30 and the pixel electrode 28. The fringe electric field includes a component parallel to the plate surface of the array substrate 21 and a component normal to the plate surface of the array substrate 21. With the fringe electric field, orientations of the liquid crystal molecules included in the liquid crystal layer 22 can be controlled and predefined display is performed based on the orientations of the liquid crystal molecules. Namely, the liquid crystal panel 11 according to this embodiment operates in fringe field switching (FFS) mode.

As illustrated in FIG. 6, color filters 29, light blocking portions 40, and an alignment film are disposed in the display area AA on an inner surface side of the color filter substrate 20. The alignment film included in each of the color filter substrate 20 and the array substrate 21 is made of organic material such as polyimide. The alignment film is disposed on an innermost surface side (closest to the liquid crystal layer 22) of the color filter substrate 20 and the array substrate 21. The upper surfaces of the alignment films that are opposite the liquid crystal layer 22 are subjected to the photo-orientation treatment and have a function of orienting the liquid crystal molecules.

As illustrated in FIG. 6, the color filters 29 are disposed to overlap the pixel electrodes 28 of the array substrate 21, respectively, and the color filter 29 and the pixel electrode 28 that are overlapped are configured as a pixel, which is a display unit. The color filters 29 include multiple kinds (three kinds) of color filters that exhibit three different colors. The color filters 29 that exhibit different colors are arranged next to each other along the extending direction in which the gate lines 25 extend (in the X-axis direction). The arrangement direction in which the color filters 29 exhibiting different colors are arranged matches the X-axis direction. The color filters 29 that exhibit different colors extend along the extending direction in which the source lines 26 extend (substantially the Y-axis direction). Namely, the color filters 29 that exhibit different colors are arranged in a stripe pattern as a whole. The color filters 29 that exhibit different colors are arranged such that boundaries therebetween (a color boundary) overlap the source lines 26. The color filters 29 include a green color filter 29G (first color filter) that exhibits green, a blue color filter 29B (second color filter) that exhibits blue, and a red color filter 29R (third color filter) that exhibits red. The green color filter 29G and the pixel electrode 28 that overlaps the green color filter 29G are configured as a green pixel (first pixel) that exhibits green. The blue color filter 29B and the pixel electrode 28 that overlaps the blue color filter 29B are configured as a blue pixel (second pixel) that exhibits blue. The red color filter 29R and the pixel electrode 28 that overlaps the red color filter 29R are configured as a red pixel (third pixel) that exhibits red. In FIG. 6, the colors exhibited by the color filters 29 are represented by R (red), G (green), and B (blue).

The light blocking portions 40 are disposed on an inner surface of the glass substrate 20GS (substrate) and included in a lower layer than the color filters 29. The light blocking portions 40 extend along the Y-axis direction and overlap the source lines 26 of the array substrate 21, respectively. The light blocking portions 40 are arranged at intervals in the X-axis direction and are arranged in a stripe pattern in a plan view. The light blocking portions 40 are disposed on color border sections that define each of the color filters 29 that exhibit different colors. Specifically, one of the light blocking portions 40 is disposed at the border between the green color filter 29G and the blue color filter 29B and another one of the light blocking portions 40 is disposed at the border between the blue color filter 29B and the red color filter 29R, and other one of the light blocking portions 40 is disposed at the border between the red color filter 29R and the green color filter 29G. The interval between the light blocking portions 40 is substantially same as the interval between the source lines 26. This prevents light from traveling between the pixels that exhibit different colors. Accordingly, mixing of colors is less likely to occur and each color of the pixels can be displayed clearly.

Figure 7:
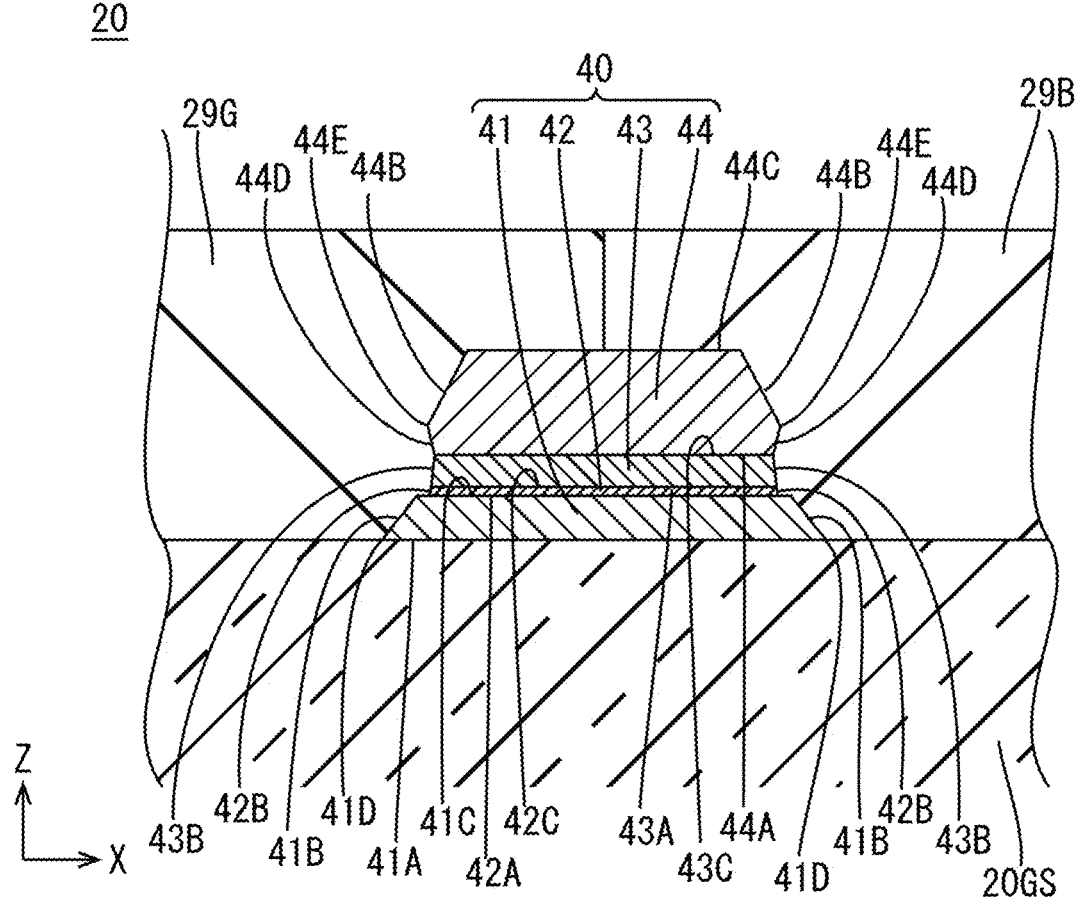
FIG. 7 is a cross-sectional view of a color filter substrate included in the liquid crystal panel according to the embodiment.

A detailed configuration of the light blocking portion 40 will be described. As illustrated in FIG. 7, the light blocking portion 40 has a multilayer structure and includes a first transmissive film 41, a first reflective film 42 (a reflective transmissive film), a second transmissive film 43, and a second reflective film 44 that are disposed on top of each other in this order from a lower layer side. The first transmissive film 41 is on an inner surface of the glass substrate 20GS. The first reflective film 42 is disposed on an upper layer side of the first transmissive film 41. The second transmissive film 43 is disposed on an upper layer side of the first reflective film 42. The second reflective film 44 is disposed on an upper layer side of the second transmissive film 43.

The first transmissive film 41 is preferably made of material that is substantially transparent and has a high refractive index. The first transmissive film 41 is preferably made of light transmissive resin material (for example, $SiN_x$ (silicon nitride)) and has a refractive index of about 1.9. The first transmissive film 41 has a function of reducing reflection of external light with using the thin-film interference. The thickness of the first transmissive film 41 is preferably from 20 nm to 100 nm to exert the function of reducing external light reflection, and is preferably about 70 nm.

The first reflective film 42 is preferably made of material having high light reflection properties and high light blocking properties. The first reflective film 42 is made of metal material (such as tungsten (W)). The first reflective film 42 has a function of reducing reflection of external light and a function of reflecting again the reflected light reflected by the second reflective film 44. The thickness of the first reflective film 42 is preferably from 3 nm to 20 nm to exert the above-described functions and is about 10 nm, for example. The thickness of the first reflective film 42 is smaller than that of the second reflective film 44. The first reflective film 42 is higher in the light transmittance and lower in the light reflectance than the second reflective film 44. The first reflective film 42 is lower in the light transmittance and higher in the light reflectance than the first transmissive film 41 and the second transmissive film 43. The first reflective film 42 has light blocking properties higher than the light blocking properties of the first transmissive film 41 and the second transmissive film 43. Specifically, the thickness of the first reflective film 42 is adjusted such that the light transmittance is about 50% and the light reflectance is about 50%.

The second transmissive film 43 is preferably made of material that is substantially transparent and has a high refractive index. The second transmissive film 43 is preferably made of light transmissive resin material (for example, $SiN_x$) and has a refractive index of about 1.9. The second transmissive film 43 has a function of reducing reflection of external light with using the thin-film interference. The thickness of the second transmissive film 43 is preferably from 20 nm to 100 nm to exert the function of reducing external light reflection, and is preferably about 60 nm. The thickness of the second transmissive film 43 is smaller than the thickness of the first transmissive film 41.

The second reflective film 44 is preferably made of material having high light reflection properties and high light blocking properties. The second reflective film 44 is made of metal material (such as tungsten (W)). The second reflective film 44 has a function of blocking light supplied by the backlight 12. Namely, the second reflective film 44 blocks the light that is to travel between the color filters 29R, 29G, 29B that are adjacent to each other in the X-axis direction and exhibit different colors. The thickness of the second reflective film 44 is preferably 30 nm or more to exert the above-described light blocking function and is about 100 nm, for example. The thickness of the second reflective film 44 is greater than that of the first reflective film 42. The second reflective film 44 is lower in the light transmittance and higher in the light reflectance and the light blocking properties than the first reflective film 42. Specifically, the thickness of the second reflective film 44 is adjusted such that the light reflectance is about 100% and the light transmittance is about 0%.

As previously described, the second reflective film 44 has the lowest light transmittance and the highest light reflectance among the films included in the light blocking portion 40. Among the external light rays entering the liquid crystal panel 11 from the front side, the amount of light rays reflected by the second reflective film 44 is greater than the amount of light rays reflected by the first reflective film 42. If the light rays reflected by the second reflective film 44 directly exit the liquid crystal panel 11, the display quality may be extremely lowered.

In this embodiment, among the films included in the light blocking portion 40, the first transmissive film 41, the first reflective film 42, and the second transmissive film 43 have a function of reducing reflection of external light that enters the liquid crystal panel 11 from the front side. In detail, the external light passes through the glass substrate 20GS of the color filter substrate 20 and enters the first transmissive film 41. Some of the light rays that enter the first transmissive film 41 reflect off an interface (a bottom surface of the first transmissive film 41) between the glass substrate 20GS and the first transmissive film 41 and the rest of the light rays pass through the first transmissive film 41 and reach the first reflective film 42. Some (about 50%) of the light rays that reach the first reflective film 42 reflect off an interface (a bottom surface of the first reflective film 42) between the first transmissive film 41 and the first reflective film 42 and the rest (about 50%) of the light rays pass through the first reflective film 42. Some of the light rays that pass through the first reflective film 42 reflect off an interface (a bottom surface of the second transmissive film 43) between the first reflective film 42 and the second transmissive film 43 and the rest of the light rays pass through the second transmissive film 43 and reach the second reflective film 44. Almost all the light rays that reach the second reflective film 44 reflect off an interface (a bottom surface of the second reflective film 44) between the second transmissive film 43 and the second reflective film 44. When the light rays that reflect off the interface between the second transmissive film 43 and the second reflective film 44 travel through the second transmissive film 43 and reach the first reflective film 42, some (50%) of the light rays travel through the first reflective film 42 and the rest (50%) of the light rays reflect off the first reflective film 42 again and travel toward the second reflective film 44. Accordingly, the reflection light that reflect off the interface between the second transmissive film 43 and the second reflective film 44 is less likely to exit the first transmissive film 41 toward the lower layer side.

The light that reflects off the interface between the first transmissive film 41 and the first reflective film 42 and the light that reflects off the interface between the second transmissive film 43 and the second reflective film 44 and passes through the first reflective film 42 cancel each other to some extent based on the conditions for interference according to the refractive index and the thickness of each of the first transmissive film 41 and the second transmissive film 43. Namely, the refractive index and the thickness of each of the first transmissive film 41 and the second transmissive film 43 are adjusted such that the phases of the light that reflects off the interface between the first transmissive film 41 and the first reflective film 42 and the light that reflects off the interface between the second transmissive film 43 and the second reflective film 44 are opposite from each other. Specifically, in this embodiment, the thickness of the first transmissive film 41 is about 70 nm, the refractive index of the first transmissive film 41 is about 1.9, the thickness of the second transmissive film 43 is about 60 nm, and the refractive index of the second transmissive film 43 is about 1.9. With such a configuration, the phases of the light that reflects off the interface between the first transmissive film 41 and the first reflective film 42 and the light that reflects off the interface between the second transmissive film 43 and the second reflective film 44 and passes through the first reflective film 42 are opposite from each other. The two types of light rays efficiently cancel each other and external light is less likely to be reflected by the light blocking portion 40. Furthermore, some of the light rays that reflect off the interface between the second transmissive film 43 and the second reflective film 44 reflect off the second reflective film 44 and the first reflective film 42 repeatedly and do not exit to the outside from the front side. Thus, light is less likely to reflect off the light blocking portion 40 and deterioration in display quality due to the light blocking portion 40 is effectively suppressed.

As previously described, the light blocking portion 40 has a multilayer structure including the first transmissive film 41, the first reflective film 42, the second transmissive film 43, and the second reflective film 44. Therefore, the exposure precision of the exposing device, which is used in patterning the light blocking portion 40 in the producing process, can be effectively increased compared to processing a light blocking portion made of resin material. Accordingly, the light blocking portion 40 can be preferably miniaturized.

Figure 8:
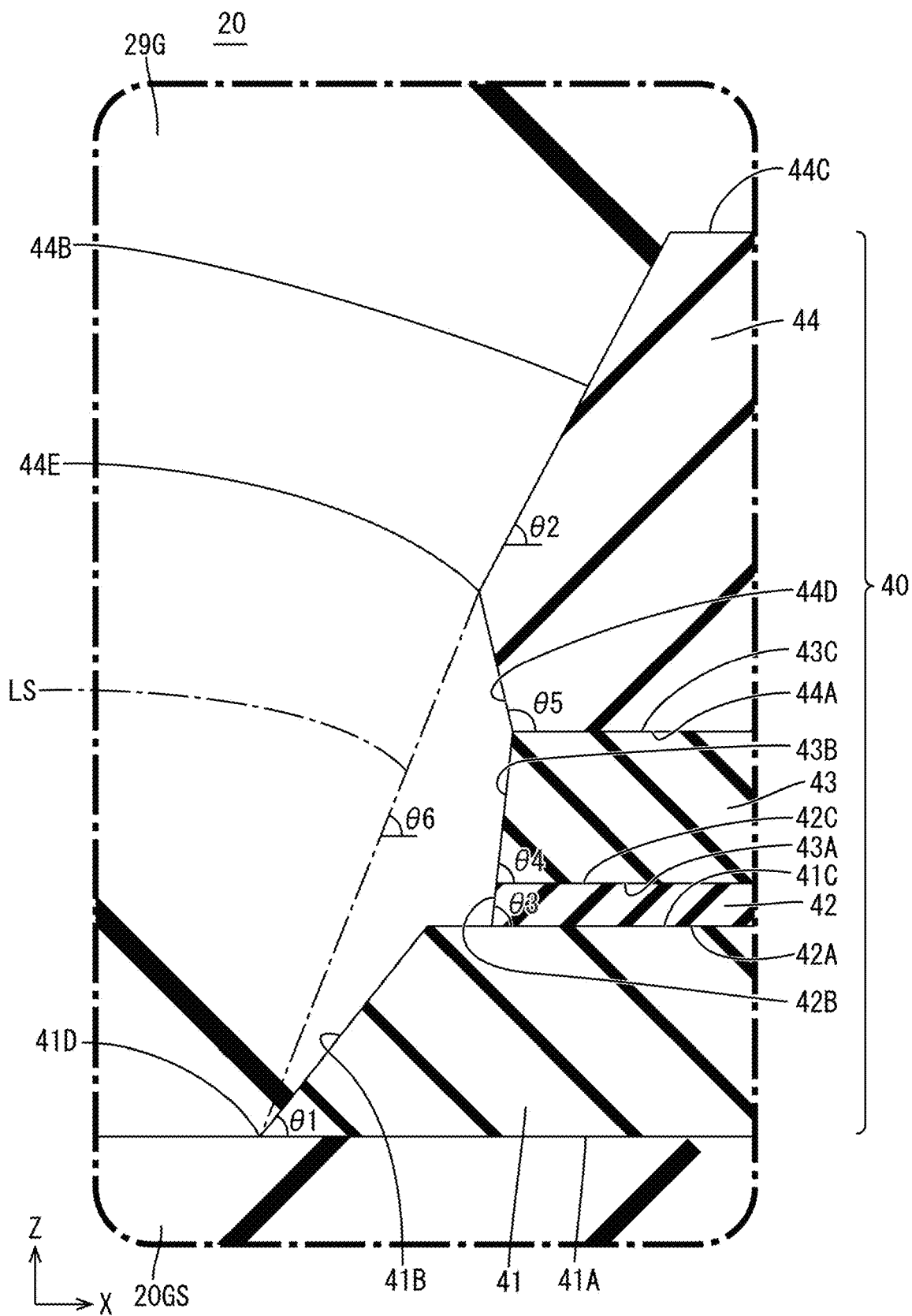
FIG. 8 is an enlarged cross-sectional view of a light blocking portion included in the color filter substrate according to the embodiment.

A detailed configuration of each of the films 41-44 of the light blocking portion 40 will be described with reference to FIG. 8. As illustrated in FIG. 8, the first transmissive film 41 has a first bottom surface 41A that is contacted with the glass substrate 20GS and a first side surface 41B that is inclined with respect to the first bottom surface 41A. The first bottom surface 41A is an opposite surface from an upper surface 41C of the first transmissive film 41 and is on an opposite side from the first reflective film 42. The first bottom surface 41A is a plane surface that extends along the X-axis direction (a width direction of the light blocking portion 40) and the Y-axis direction (a longitudinal direction of the light blocking portion 40). The first transmissive film 41 has two first side surfaces 41B on two side edges with respect to the X-axis direction, respectively. The first side surfaces 41B are inclined surfaces that are inclined at a first angle $\theta 1$ to the first bottom surface 41A. The first angle $\theta 1$ is an acute angle and smaller than 90°. Namely, the first side surface 41B is a tapered surface with respect to the first bottom surface 41A. Specifically, the first angle $\theta 1$ is from 29° to 75°, for example, and is about 52° in FIG. 8. A basal end of the first side surface 41B (a contact portion of the first side surface 41B and an inner surface of the glass substrate 20GS) corresponds to an outer edge 41D of the first transmissive film 41 with respect to the X-axis direction.

As illustrated in FIG. 8, the second reflective film 44 has a second bottom surface 44A that is contacted with an upper surface 43C of the second transmissive film 43 and a second side surface 44B that is inclined with respect to the second bottom surface 44A. The second bottom surface 44A is an opposite surface from an upper surface 44C of the second reflective film 44 and extends parallel to the first bottom surface 41A. The second reflective film 44 has two second side surfaces 44B on two side edges with respect to the X-axis direction, respectively. The second side surfaces 44B are inclined surfaces that are inclined at a second angle $\theta 2$ to the second bottom surface 44A. The second angle $\theta 2$ is an acute angle and smaller than 90°. Namely, the second side surface 44B is a tapered surface with respect to the second bottom surface 44A. Specifically, the second angle $\theta 2$ is from 50° to 65°, for example, and is about 57° in FIG. 8.

In this embodiment, the first side surface 41B is inclined at the first angle $\theta 1$, which is an acute angle, with respect to the first bottom surface 41A of the first transmissive film 41 and the second side surface 44B is inclined at the second angle $\theta 2$, which is an acute angle, with respect to the second bottom surface 44A of the second reflective film 44. Therefore, compared to the configuration in which an obtuse angle is formed between the first side surface and the first bottom surface 41A and an obtuse angle is formed between the second side surface and the second bottom surface 44A, wettability of the material of each color filter 29R, 29G, 29B around the light blocking portion 40 is improved when forming the color filters 29R, 29G, 29B in the producing process. The material of the color filters 29R, 29G, 29B is less likely to be repelled near the light blocking portion 40. Therefore, a hole (a missing portion) is less likely to be unintentionally formed in the color filters 29R, 29G, 29B.

As illustrated in FIG. 8, the first reflective film 42 has a third bottom surface 42A that is contacted with the upper surface 41C of the first transmissive film 41 and a third side surface 42B that is inclined at a third angle $\theta 3$ to the third bottom surface 42A. The third bottom surface 42A is an opposite surface from an upper surface 42C of the first reflective film 42 and is on an opposite side from the second transmissive film 43 and extends parallel to the first bottom surface 41A. The first reflective film 42 has two third side surfaces 42B on two side edges with respect to the X-axis direction, respectively. The third angle $\theta 3$ formed between the third side surface 42B and the third bottom surface 42A may be smaller than 90° but may be greater than 90° or may be 90°. Namely, the third side surface 42B may be a tapered surface with respect to the third bottom surface 42A or may be a reversely tapered surface or may be a vertical surface. Specifically, the third angle $\theta 3$ is from 73° to 105°, for example, and is about 80° in FIG. 8. The third angle $\theta 3$ is greater than the first angle $\theta 1$ and the second angle $\theta 2$. In this embodiment, the first reflective film 42 is configured such that the third side surface 42B is not contacted with the first side surface 41B but is contacted with the upper surface 41C of the first transmissive film 41. Namely, the third side surfaces 42B of the first reflective film 42 are disposed inward with respect to the first side surfaces 41B of the first transmissive film 41, respectively.

As illustrated in FIG. 8, the second transmissive film 43 has a fourth bottom surface 43A that is contacted with the upper surface 42C of the first reflective film 42 and a fourth side surface 43B that is inclined at a fourth angle $\theta 4$ to the fourth bottom surface 43A. The fourth bottom surface 43A is an opposite surface from the upper surface 43C of the second transmissive film 43 and is on an opposite side from the second reflective film 44 and extends parallel to the first bottom surface 41A. The second transmissive film 43 has two fourth side surfaces 43B on two side edges with respect to the X-axis direction, respectively. The fourth angle $\theta 4$ formed between the fourth side surface 43B and the fourth bottom surface 43A may be smaller than 90° but may be greater than 90° or may be 90°. Namely, the fourth side surface 43B may be a tapered surface with respect to the fourth bottom surface 43A or may be a reversely tapered surface or may be a vertical surface. Specifically, the fourth angle $\theta 4$ is from 73° to 105°, for example, and is about 80° in FIG. 8. The fourth angle $\theta 4$ is greater than the first angle $\theta 1$ and the second angle $\theta 2$. In this embodiment, the second transmissive film 43 is configured such that the fourth side surface 43B is on a substantially same plane as the third side surface 42B of the first reflective film 42. The fourth side surface 43B and the third side surface 42B extend planarly. The fourth side surfaces 43B of the second transmissive film 43 are disposed inward with respect to the first side surfaces 41B of the first transmissive film 41, respectively.

As illustrated in FIG. 8, the second reflective film 44 includes fifth side surfaces 44D in addition to the second side surfaces 44B. The fifth side surface 44D is inclined at a fifth angle $\theta 5$, which is an obtuse angle, to the second bottom surface 44A. The fifth side surfaces 44D are contacted with the respective second side surfaces 44B and the second bottom surface 44A. Namely, the fifth side surface 44D are reversely tapered surfaces with respect to the second bottom surface 44A. Specifically, the fifth angle $\theta 5$ is from 97° to 137°, for example, and is about 110° in FIG. 8. A portion where the fifth side surface 44D and the second side surface 44B join is configured as an outer edge 44E of the second reflective film 44 with respect to the X-axis direction. Namely, the second reflective film 44 is configured such that a portion thereof including the outer edge 44E project outwardly in the X-axis direction with respect to the second transmissive film 43. The fifth side surface 44D and the second side surface 44B join at the portion that is closer to the second bottom surface 44A than the upper surface 44C with respect to the Z-axis direction. Namely, the area of the fifth side surface 44D is smaller than the area of the second side surface 44B.

As illustrated in FIG. 8, the light blocking portion 40 is configured such that an acute angle is formed between the first bottom surface 41A and a line segment LS extending from the outer edge 41D of the first transmissive film 41 to the outer edge 44E of the second reflective film 44. Specifically, the light blocking portion 40 is configured such that a sixth angle θ6 formed between the line segment LS and the first bottom surface 41A is from 70° to 90°. The line segment LS is illustrated with a long-dashed short-dashed line in FIG. 8. The sixth angle θ6 is greater than the first angle θ1 and the second angle θ2.

The liquid crystal display device 10 according to this embodiment has the configuration described above and the method of producing the liquid crystal display device 10 will be described next. The liquid crystal panel 11 and the backlight 12 that are separately produced are joined together and the liquid crystal display device 10 is produced. The method of producing the liquid crystal panel 11 includes a color filter substrate producing process (a CF substrate producing process) in which the color filter substrate 20 is produced, an array substrate producing process in which the array substrate 21 is produced, and a bonding process in which the color filter substrate 20 and the array substrate 21 are joined together. In the following, the color filter substrate producing process will be described.

The color filter substrate producing process at least includes a first process (a light blocking portion forming process) in which the light blocking portion 40 is formed on an inner surface of the glass substrate 20GS and a second process (a color filter forming process) in which the color filters 29 are formed in an upper layer than the light blocking portion 40. In the following, the first process will be described in detail.

In the first process, the first transmissive film 41, the first reflective film 42, the second transmissive film 43, the second reflective film 44, and a resist film R are deposited (a film forming process), and the resist film R is exposed with light and development is performed (an exposure and development process). In the film forming process, the first transmissive film 41 is deposited on the glass substrate 20GS (a substrate), the first reflective film 42 is deposited on an upper layer side of the first transmissive film 41, the second transmissive film 43 is deposited on an upper layer side of the first reflective film 42, the second reflective film 44, which has a thickness greater than a thickness of the first reflective film 42, is deposited on an upper layer side of the second transmissive film 43, and the resist film R having photosensitive properties is deposited on an upper layer side of the second reflective film 44. The resist film R may be a positive type or a negative type. In the exposure and development process, the resist film R is irradiated with light emitted by a light source of an exposing device through a photomask having a predefined exposure pattern. The resist film R is selectively exposed according to the exposure pattern of the photomask. With the exposed resist film R being developed, the exposed portions or the unexposed portions of the resist film R are selectively removed (refer to FIG. 11).

Figure 9:
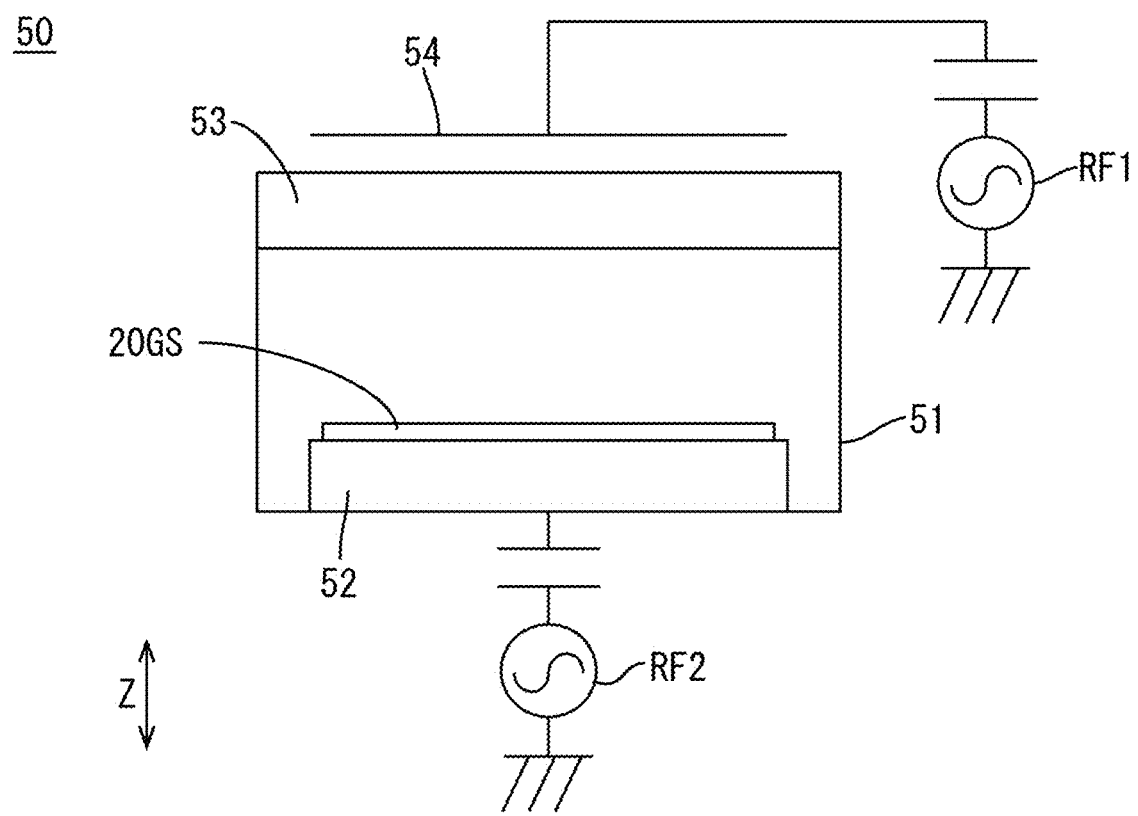
FIG. 9 is a view illustrating a general configuration of an etching device used in a first process of a color filter substrate producing process according to the embodiment.

In the first process, after the exposure and development process, etching is performed with using the resist film R as a mask (an etching process). In the etching process, an etching device 50 illustrated in FIG. 9 is used. The etching device 50 will be described. The etching device 50 used in this embodiment is a dry etching device of an inductively coupled plasma (ICP) etching method. As illustrated in FIG. 9, the etching device 50 at least includes a vacuum chamber 51 (an etching chamber), a substrate support base 52, an induction member 53, and a coil 54 (an antenna). The glass substrate 20GS can be arranged in the vacuum chamber 51 and the vacuum chamber 51 can be kept in a vacuumed state when the etching is performed. The induction member 53 is made of fused quartz, for example, and arranged in an upper section inside the vacuum chamber 51. The coil 54 is arranged above the induction member 53 outside the vacuum chamber 51. The coil 54 is connected to a first radio-frequency power source RF1 (a plasma generation supply) and a radio-frequency current is supplied from the first radio-frequency power source RF1. According to the supply of radio-frequency current to the coil 54 from the first radio-frequency power source RF1, an induction field is generated in plasmas. This accelerates electrons and high density plasmas are generated. The substrate support base 52 is arranged in a lower section inside the vacuum chamber 51 and supports the glass substrate 20GS. The substrate support base 52 is configured as a lower electrode and connected to a second radio-frequency power source RF2 (a bias supply). The substrate support base 52, which is the lower electrode, is supplied with a radio-frequency current from the second radio-frequency power source.

Figure 10:
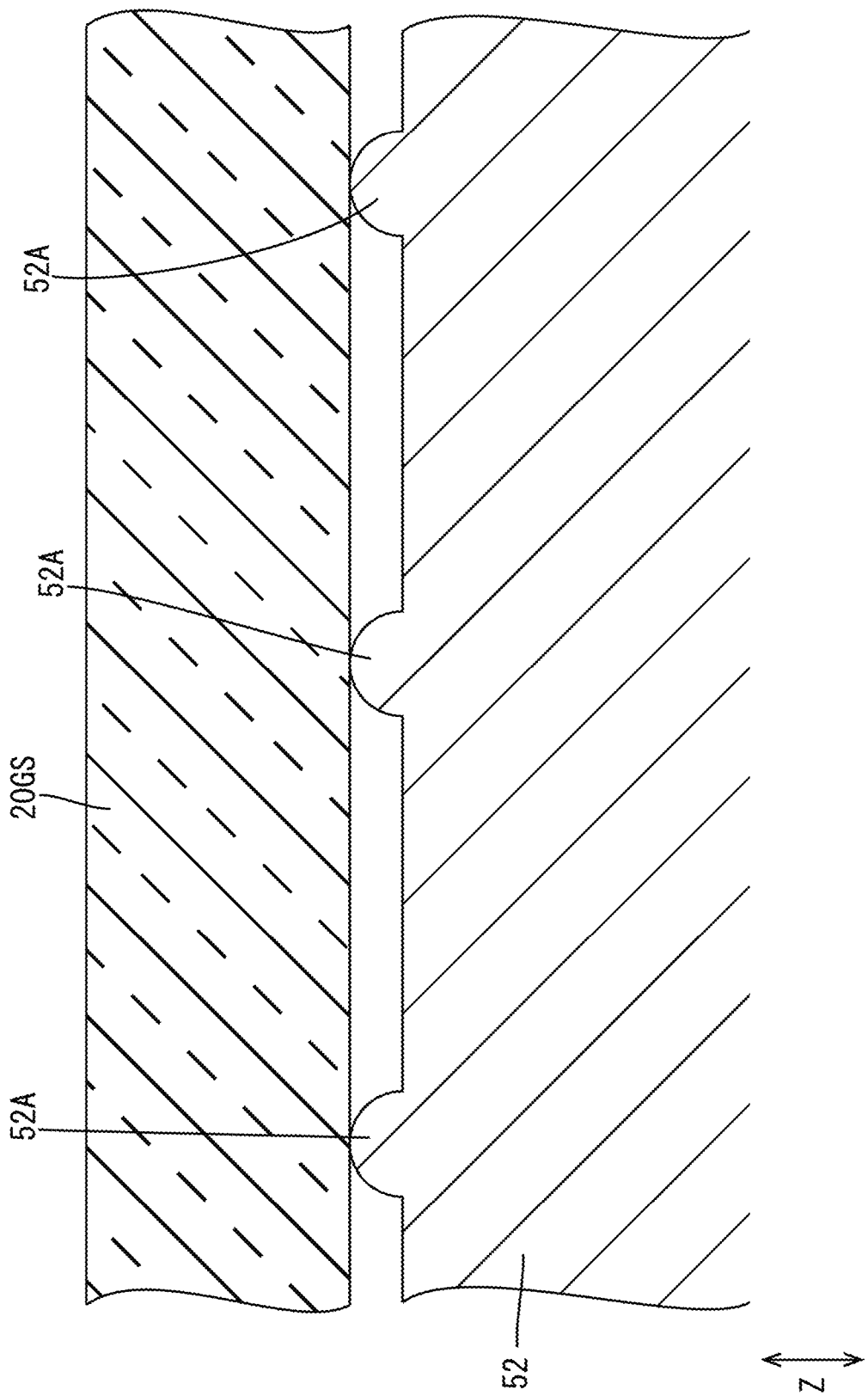
FIG. 10 is a cross-sectional view illustrating a glass substrate that is supported by protrusions of a substrate support base included in the etching device according to the embodiment.

As illustrated in FIG. 10, the substrate support base 52 includes protrusions 52A (embossed portions) on a surface that is opposite the glass substrate 20GS. The protrusions 52A are arranged at intervals in the X-axis direction and the Y-axis direction within a surface area of the glass substrate 20GS and support the glass substrate 20GS from a lower side. The intervals of the protrusions 52A are about a few millimeters. The protrusions 52A have a substantially semicircular shape and are contacted with the surface of the glass substrate 20GS at points. With the substrate support base 52 including the protrusions 52A, the contact area of the substrate support base 52 contacted with the glass substrate 20GS is smaller compared to the contact area of a substrate support base that is surface-contacted with the surface of the glass substrate 20GS. With such a configuration, even if the material of the first reflective film 42 and the second reflective film 44 scatters due to the etching and adheres to the surface of the substrate support base 52, etching errors are less likely to be caused by the material adhering to the substrate support base 52.

On the other hand, as illustrated in FIG. 10, the glass substrate 20GS includes contact portions that are contacted with the protrusions 52A and non-contact portions that are not contacted with the protrusions 52A. Therefore, the glass substrate 20GS may have difference in heat dissipation ability between the contact portions and the non-contact portions. With the contact portions and the non-contact portions of the glass substrate 20GS having difference in the heat dissipation ability, the etching amount in the resist film R is also varied and the obtained light blocking portions 40 may have different widths (a dimension measured in the X-axis direction). With the width of the light blocking portions 40 varying depending on the portions of the glass substrate 20GS, display unevenness corresponding to the intervals of the protrusions 52A may be recognized.

To solve such problems, in this embodiment, the etching process includes a first etching process and a second etching process in which the etching speed is lower than that in the first etching process. More in detail, in the first etching process, at least the second reflective film 44 is subjected to etching with using the resist film R as a mask and the etching speed is higher than the etching speed in the second etching process. Specifically, in the first etching process, by using at least $SF_6$ gas as the etching gas (reactive gas) that is introduced into the vacuum chamber 51, the etching speed is increased to be higher than the etching speed in the second etching process. In the second etching process, the second reflective film 44, the second transmissive film 43, the first reflective film 42, and the first transmissive film 41 are subjected to etching with using the resist film R as a mask and the etching speed is lower than the etching speed in the first etching process. Specifically, in the second etching process, by using at least $CF_4$ gas and $O_2$ gas as the etching gas that is introduced into the vacuum chamber 51, the etching speed is decreased to be lower than the etching speed in the first etching process.

Figure 11:
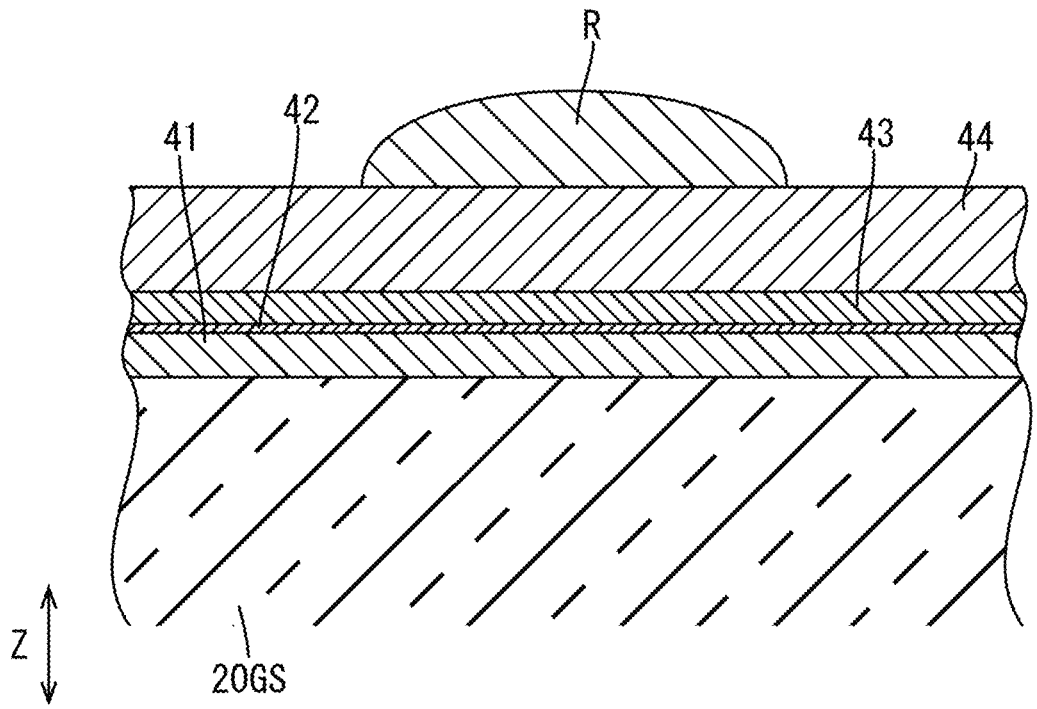
FIG. 11 is a cross-sectional view illustrating a resist film that is exposed with light to be developed in the first process of the color filter substrate producing process according to the embodiment.
Figure 12:
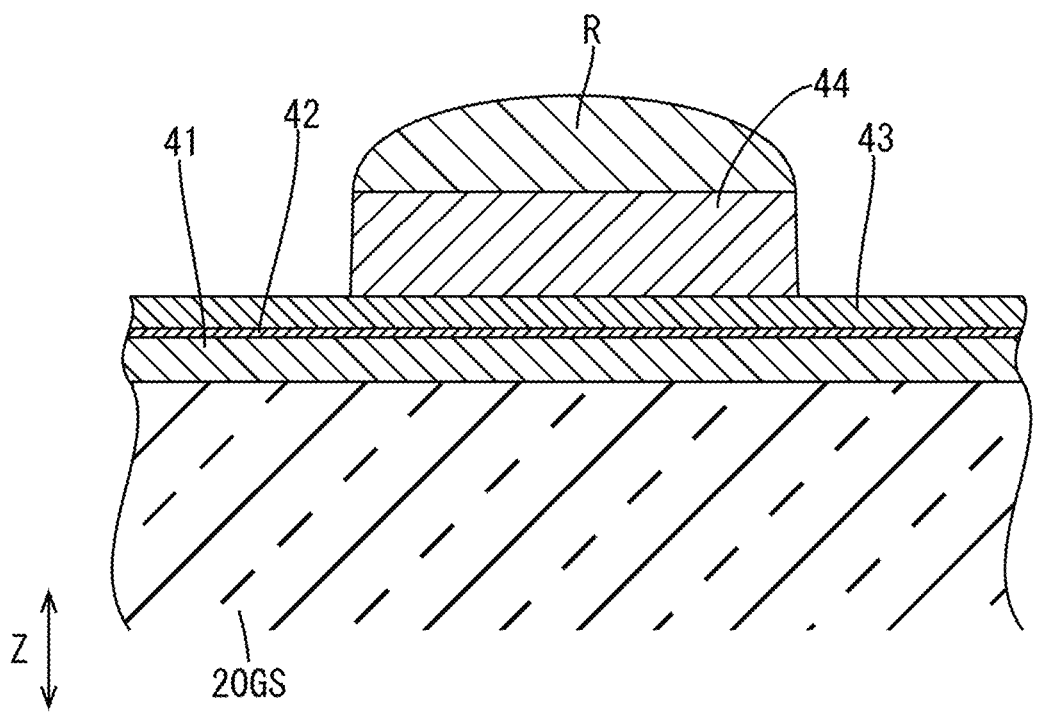
FIG. 12 is a cross-sectional view illustrating the films after the first etching of the first process of the color filter substrate producing process.

In the first etching process, as illustrated in FIG. 11, at least the second reflective film 44 is subjected to etching through the resist film R that is patterned through the exposure and development process. With the first etching process being performed, as illustrated in FIG. 12, the uncovered portion of at least the second reflective film 44 that is not covered by the resist film R is removed. With the etching speed in the first etching process being higher than the etching speed in the second etching process, after the first etching process, the second reflective film 44 is processed such that the side surfaces of the second reflective film 44 extend to form a large angle that is close to 90° with respect to the bottom surface.

Figure 13:
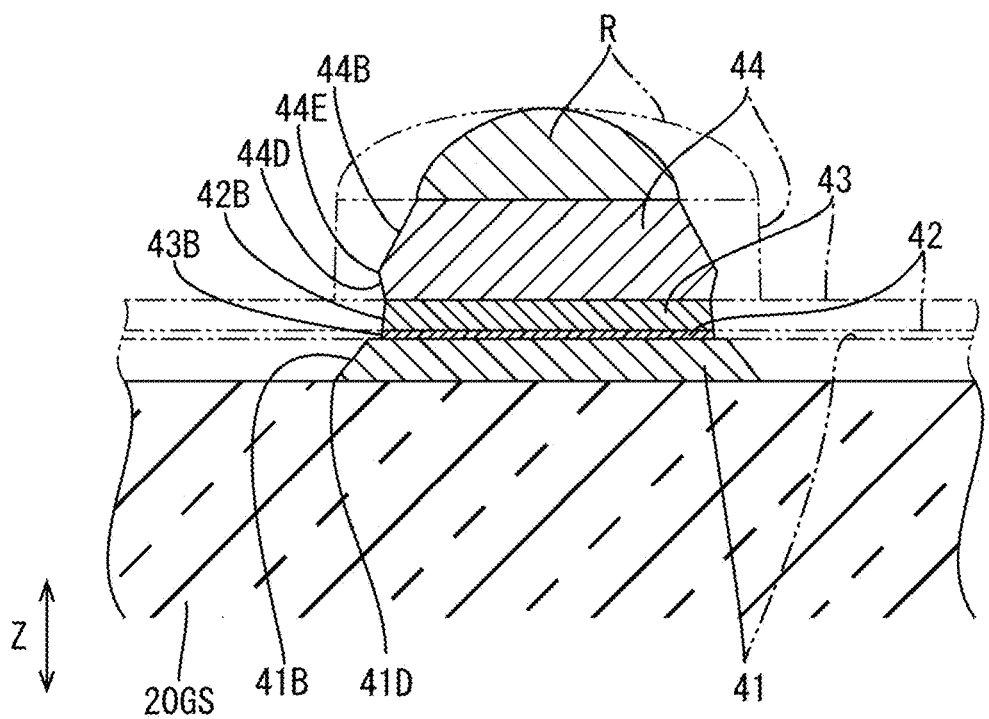
FIG. 13 is a cross-sectional view illustrating the films after the second etching of the first process of the color filter substrate producing process.

Next, with the second etching process being performed through the resist film R, as illustrated in FIG. 13, the uncovered portions of the second reflective film 44, the second transmissive film 43, the first reflective film 42, and the first transmissive film 41 that are not covered by the resist film R are removed and the light blocking portion 40 is formed. The films 41-44 before performing the second etching process are illustrated with a long-dashed double short-dashed line in FIG. 13. With the etching speed in the second etching process being lower than the etching speed in the first etching process, as the etching is performed, the second reflective film 44, the second transmissive film 43, the first reflective film 42, and the first transmissive film 41 are gradually etched with the resist film R being gradually etched. As a result, the second reflective film 44, the second transmissive film 43, the first reflective film 42, and the first transmissive film 4 are processed such that the angles at which the side surfaces 41B-44B are inclined with respect to the bottom surfaces 41A-41A, respectively, are smaller than the corresponding angles with only the first etching process being performed without performing the second etching process in the etching process. After the second etching process, the ashing is performed to remove the resist film R (an ashing process).

After the first process, the second process is performed. In the second process, the material of each of the color filters 29R, 29G, 29B is sequentially coated on the inner surface of the glass substrate 20GS with using an ink jetting device. For example, with the material of the green color filter 29G being coated on the glass substrate 20GS, edge portions of the green color filter 29G are disposed on an upper layer side of the light blocking portion 40. Next, with the material of the blue color filter 29B being coated on the glass substrate 20GS, edge portions of the blue color filter 29B are disposed on an upper layer side of the light blocking portion 40 and one of the edge portions is disposed next to the green color filter 29G. Then, with the material of the red color filter 29R being coated on the glass substrate 20GS, edge portions of the red color filter 29R are disposed on an upper layer side of the light blocking portion 40 and one of the edge portions of the red color filter 29R is disposed next to the green color filter 29G or the blue color filter 29B. The order of coating the color filters 29R, 29G, 29B may be altered from the above described one.

As previously described, in the first process of this embodiment, the second etching process is performed after performing the first etching process. Accordingly, at least the first angle θ1 at which the first side surface 41B is inclined with respect to the first bottom surface 41A of the first transmissive film 41 and the second angle θ2 at which the second side surface 44B is inclined with respect to the second bottom surface 44A of the second reflective film 44 can be acute angles. The first reflective film 42 and the second transmissive film 43 are configured such that the side surfaces 42B, 43B are disposed inward with respect to the first side surface 41B of the first transmissive film 41. The third side surface 42B is not contacted with the first side surface 41B but contacted with the upper surface 41C of the first transmissive film 41. The third angle θ3, which is formed between the third side surface 42B and the third bottom surface 42A of the first reflective film 42, and the fourth angle θ4, which is formed between the fourth side surface 43B and the fourth bottom surface 43A of the second transmissive film 43, are greater than the first angle θ1.

According to this embodiment, with the etching process including the first etching process and the second etching process, the first transmissive film 41 and the second transmissive film 43 are less likely to be etched compared to the etching process only including the first etching process. Therefore, a large undercut is less likely to occur in the light blocking portion 40. Furthermore, according to this embodiment, the first angle θ1 at which the first side surface 41B is inclined with respect to the first bottom surface 41A of the first transmissive film 41 and the second angle θ2 at which the second side surface 44B is inclined with respect to the second bottom surface 44A of the second reflective film 44 can be increased to be large angles compared to those obtained through the etching process only including the second etching process. Therefore, heat dissipation ability from the second reflective film 44 to the first transmissive film 41 is lowered and this can reduce the difference in the heat dissipation ability between the contact portions of the glass substrate 20GS that are contacted with the protrusions 52A and the non-contact portions that are not contacted with the protrusions 52A. Accordingly, the widths of the light blocking portions 40 can be equalized and the amounts of light rays passing through the color filters 29R, 29G, 29B can be equalized. Compared to the configuration in which a first angle, which is formed between a first side surface and the first bottom surface 41A of the first transmissive film 41, and a second angle at which a second side surface is inclined with respect to the second bottom surface 44A of the second reflective film 44 are obtuse angles, the wettability of the material of the color filters 29G, 29B near the light blocking portion 40 is improved when the color filters 29G, 29B are formed in the second process. Therefore, the material of the color filters 29G, 29B is less likely to be repelled near the light blocking portion 40 and a hole is less likely to be unintentionally formed in the color filters 29G, 29B.

The third side surface 42B of the first reflective film 42 is disposed inward with respect to the first side surface 41B. Therefore, the heat dissipation ability from the first reflective film 42 to the first transmissive film 41 is lowered compared to the heat dissipation ability with a configuration in which a third surface is contacted with the first side surface 41B. Therefore, even with the substrate support base 52 of the etching device 50 used in the etching process including the protrusions 52A that are arranged at intervals, the difference in the heat dissipation ability between the contact portions of the glass substrate 20GS that are contacted with the protrusions 52A and the non-contact portions that are not contacted with the protrusions 52A is less likely to be caused. Accordingly, the widths of the light blocking portions 40 can be equalized and the amounts of light rays passing through the color filters 29R, 29G, 29B can be equalized. Furthermore, the light blocking portion 40 is configured such that the third angle θ3 and the fourth angle θ4 are greater than the first angle θ1. Therefore, the heat dissipation ability from the first reflective film 42 to the first transmissive film 41 is lowered compared to the heat dissipation ability with a configuration in which the third angle θ3 and the fourth angle θ4 are same as or smaller than the first angle θ1. This further equalizes the obtained light blocking portions 40. The second reflective film 44 includes the fifth side surface 44D and the fifth side surface 44D is inclined at the fifth angle θ5, which is an obtuse angle, with respect to the second bottom surface 44A. A portion of the second reflective film 44 protrudes outward with respect to the second transmissive film 43. With such a configuration, the heat dissipation ability from the second reflective film 44 to the second transmissive film 43 is lowered compared to the heat dissipation ability with a configuration in which the second reflective film does not include the fifth side surface 44D. This further equalizes the obtained light blocking portions 40.

The light blocking portion 40 is configured such that the sixth angle θ6 formed between the line segment LS, which extends from the outer edge 41D of the first transmissive film 41 to the outer edge 44E of the second reflective film 44, and the first bottom surface 41A is from 70° to 90°. With the sixth angle θ6 being 90° or smaller, the wettability of the material of the color filters 29R, 29G, 29B near the light blocking portion 40 is improved when the color filters 29R, 29G, 29B are formed in the second process compared to the configuration in which the sixth angle is greater than 90°. Accordingly, the material of the color filters 29R, 29G, 29B is less likely to be repelled near the light blocking portion 40 and a hole is less likely to be unintentionally formed in the color filters 29R, 29G, 29B. On the other hand, with the sixth angle θ6 being 70° or greater, the heat dissipation ability from the second reflective film 44 to the first transmissive film 41 is lowered compared to the heat dissipation ability with a configuration in which the sixth angle is smaller than 70°. Therefore, even with the substrate support base 52 of the etching device 50 used in the etching process including the protrusions 52A that are arranged at intervals, the difference in the heat dissipation ability between the contact portions of the glass substrate 20GS that are contacted with the protrusions 52A and the non-contact portions that are not contacted with the protrusions 52A is less likely to be caused. Accordingly, the widths of the light blocking portions 40 are equalized and the amounts of light rays passing through the color filters 29R, 29G, 29B can be equalized.

Next, to testify the advantageous effects of the color filter substrate 20 of this embodiment, Comparative Experiment 1 was performed. In Comparative Experiment 1, with varying the conditions in the first process included in the color filter substrate producing process as described below, the color filter substrates including the light blocking portions of Comparative Examples 1 to 4 and the color filter substrates 20 including the light blocking portions 40 of Examples 1 to 7 are obtained.

In Comparative Example 1, only the first etching process is performed in the first process and $SF_6$ gas and $O_2$ gas are used. In Comparative Examples 2 and 3, only the second etching process is performed in the first process and $CF_4$ gas and $O_2$ gas are used. In Comparative Examples 2 and 3, the process was performed under the same conditions; however, the etching was performed in different vacuum chambers 51 included in the etching device 50. In Comparative Example 4 and Examples 1 to 7, the first etching process and the second etching process are performed in the first process and the second etching process is performed after the first etching process. In Comparative Example 4 and Examples 1 to 7, $SF_6$ gas and $O_2$ gas are used in the first etching process and $CF_4$ gas, $O_2$ gas, and $Cl_2$ gas are used in the second etching process.

On the other hand, in each of Comparative Example 4 and Examples 1 to 7, one of the time for performing the first etching process, the time for performing the second etching process, and the flow rate of $Cl_2$ gas in the second etching process is varied. The time for performing the first etching process, the time for performing the second etching process, and the flow rate of $Cl_2$ gas in Example 1 are used as reference parameters. Specifically, in Example 2, the time for performing the first etching process is longer than that in Example 1 by ten seconds. In Example 3, the time for performing the first etching process is shorter than that in Example 1 by ten seconds. In Example 4, the flow rate of $Cl_2$ gas in the second etching process in Example 1 is 1.33 times as that in Example 1. In Example 5, the flow rate of $Cl_2$ gas in the second etching process in Example 1 is 0.66 times as that in Example 1. In Example 6, the time for performing the second etching process is longer than that in Example 1 by fifteen seconds. In Example 7, the time for performing the second etching process is shorter than that in Example 1 by fifteen seconds. In Comparative Example 4, the time for performing the second etching process is longer than that in Example 1 by thirty seconds.

Figure 14:
FIG. 14 is a table illustrating an experiment result of Comparative Example 1 of Comparative Experiment 1 according to the embodiment.
Figure 19:
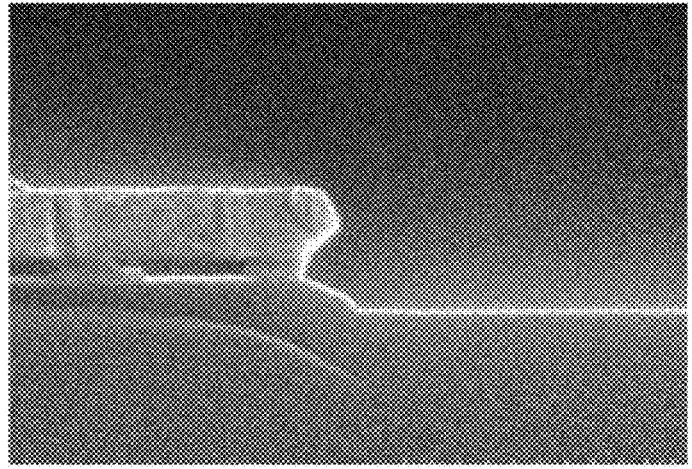
FIG. 19 is a table illustrating an experiment result of Example 2 of Comparative Experiment 1 according to the embodiment.
Figure 20:
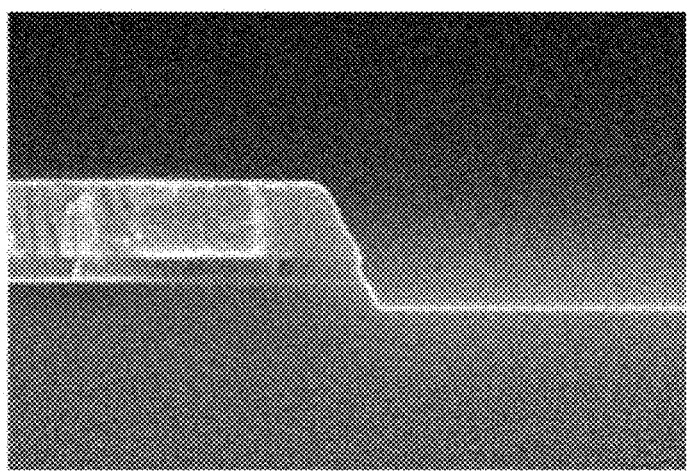
FIG. 20 is a table illustrating an experiment result of Example 3 of Comparative Experiment 1 according to the embodiment.
Figure 21:
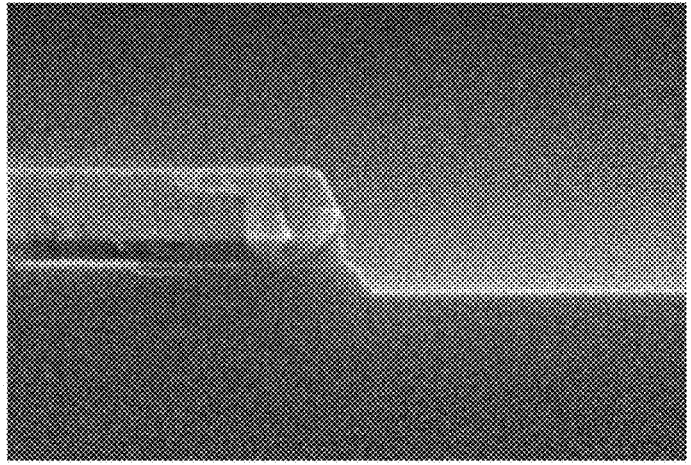
FIG. 21 is a table illustrating an experiment result of Example 4 of Comparative Experiment 1 according to the embodiment.
Figure 22:
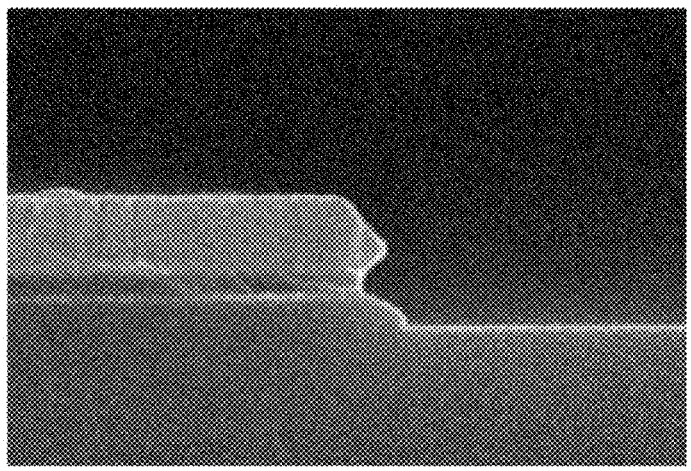
FIG. 22 is a table illustrating an experiment result of Example 5 of Comparative Experiment 1 according to the embodiment.
Figure 23:
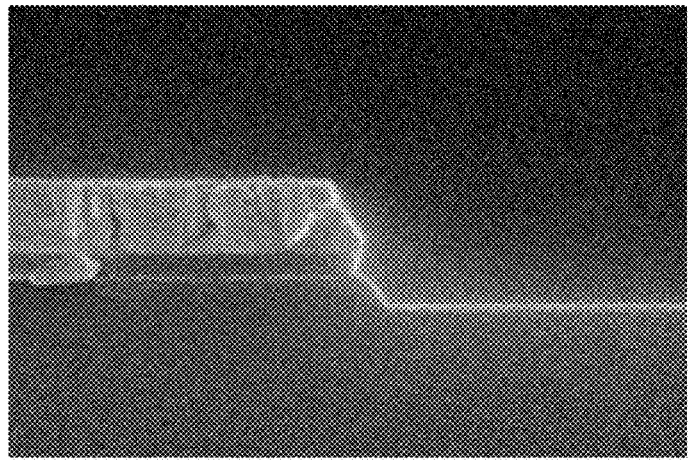
FIG. 23 is a table illustrating an experiment result of Example 6 of Comparative Experiment according to the embodiment.
Figure 24:
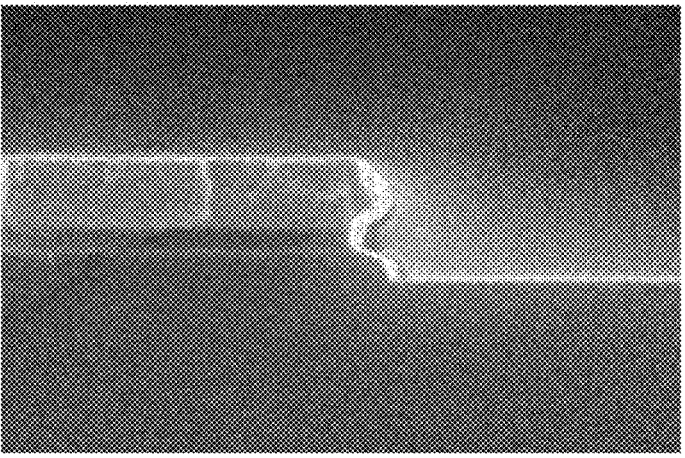
FIG. 24 is a table illustrating an experiment result of Example 7 of Comparative Experiment 1 according to the embodiment.

In Comparative Experiment 1, with respect to the color filter substrates of Comparative Examples 1 to 4 and Examples 1 to 7, images (SEM images) of light blocking portions were obtained with using a scanning electron microscope (SEM). With using the obtained images of the light blocking portions, the sixth angle θ6 formed between the line segment LS that extends from the outer edge 41D of the first transmissive film 41 to the outer edge 44E of the second reflective film 44 and the first bottom surface 41A was measured. Furthermore, the color filter substrate of each of Comparative Examples 1 to 4 and Examples 1 to 7 was bonded to the array substrate 21 to produce a liquid crystal panel. A lighting test of the produced liquid crystal panel was performed to determine whether display unevenness (display error) was recognized or not. Experimental results of Comparative Experiment 1 are illustrated in FIGS. 14 to 24. In each of FIGS. 14 to 24, the image, the sixth angle θ6, and a determination result are illustrated. The unit of the sixth angle θ6 is "°". The determination results are illustrated with "good" when display unevenness is less likely to be recognized, "failed" when display unevenness is entirely recognized, and "not good" when display unevenness is partially recognized. FIG. 14 illustrates the experimental result of Comparative Example 1. FIG. 15 illustrates the experimental result of Comparative Example 2. FIG. 16 illustrates the experimental result of Comparative Example 3. FIG. 17 illustrates the experimental result of Comparative Example 4. FIG. 18 illustrates the experimental result of Example 1. FIG. 19 illustrates the experimental result of Example 2. FIG. 20 illustrates the experimental result of Example 3. FIG. 21 illustrates the experimental result of Example 4. FIG. 22 illustrates the experimental result of Example 5. FIG. 23 illustrates the experimental result of Example 6. FIG. 24 illustrates the experimental result of Example 7.

The experimental results of Comparative Experiment 1 will be described. As illustrated in FIGS. 14 to 17, the determination results of Comparative Examples 1 to 4 are "failed" or "not good" and the sixth angle θ6 is smaller than 70° or greater than 90°. Specifically, in Comparative Example 1, the determination result was "failed" and the sixth angle θ6 was 99°. In Comparative Example 2, the determination result was "not good" and the sixth angle θ6 was 50°. In Comparative Example 3, the determination result was "failed" and the sixth angle θ6 was 47°. In Comparative Example 4, the determination result was "not good" and the sixth angle θ6 was 64°. In Comparative Example 1, a large undercut occurred in the light blocking portion and the sixth angle θ6 was greater than 90°. Therefore, when the color filters 29R, 29G, 29B are formed, the wettability of the material of the color filters 29R, 29G, 29B was deteriorated near the light blocking portion. This causes repulsion of the material and a hole (a missing portion) was unintentionally formed in the color filters 29R, 29G, 29B and the determination result was presumably determined to be "failed". In each of Comparative Examples 2 to 4, the sixth angle θ6 was smaller than 70° and therefore, heat dissipation ability from the second reflective film 44 to the first transmissive film 41 was increased. Therefore, a large difference in the heat dissipation ability is caused between the contact portions of the glass substrate 20GS that are contacted with the protrusions 52A of the substrate support base 52 of the etching device 50, which is used in the first process, and the non-contact portions that are not contacted with the protrusions 52A. This causes a large difference in the widths of the light blocking portions. As a result, a large difference is caused in the amounts of light rays passing through the color filters 29R, 29G, 29B and the determination result was presumably determined to be "not good" or "failed". Particularly in Comparative Example 3, the sixth angle θ6 was 47°, which is smaller than 50°, and a large difference in the widths of the light blocking portions was caused and therefore, the determination result was presumably determined to be "failed". On the other hand, in each of Comparative Examples 2 and 4, the sixth angle θ6 was 50° or greater and a difference in the widths of the light blocking portions was smaller than that of Comparative Example 3 and therefore, the determination result was presumably determined to be "not good".

As illustrated in FIGS. 18 to 24, the determination results of Examples 1 to 7 were "good" and the sixth angle θ6 was 70° or greater and 90° or smaller. Specifically, in Example 1, the determination result was "good" and the sixth angle θ6 was 74°. In Example 2, the determination result was "good" and the sixth angle θ6 was 78°. In Example 3, the determination result was "good" and the sixth angle θ6 was 70°. In Example 4, the determination result was "good" and the sixth angle θ6 was 70°. In Example 5, the determination result was "good" and the sixth angle θ6 was 74°. In Example 6, the determination result was "good" and the sixth angle θ6 was 71°. In Example 7, the determination result was "good" and the sixth angle θ6 was 81°. In each of Examples 1 to 7, the sixth angle θ6 is 90° or smaller. Therefore, compared to Comparative Example 1 in which the sixth angle θ6 is greater than 90°, the wettability of the material of the color filters 29R, 29G, 29B was improved near the light blocking portion 40 when the color filters 29R, 29G, 29B are formed. Therefore, repulsion of the material is less likely to be caused and a hole is less likely to be unintentionally formed in the color filters 29R, 29G, 29B and the determination result was presumably determined to be "good". In each of Examples 1 to 7, the sixth angle θ6 was 70° or greater and therefore, heat dissipation ability from the second reflective film 44 to the first transmissive film 41 was lowered compared to Comparative Examples 2 to 4 in which the sixth angle θ6 is less than 70°. Therefore, in Examples 1 to 7, a difference in the heat dissipation ability is less likely to be caused between the contact portions of the glass substrate 20GS that are contacted with the protrusions 52A of the substrate support base 52 of the etching device 50, which is used in the first process, and the non-contact portions that are not contacted with the protrusions 52A. Difference in the widths of the light blocking portions 40 is less likely to be caused. As a result, difference is less likely to be caused in the amounts of light rays passing through the color filters 29R, 29G, 29B and the determination result was presumably determined to be "good". As previously described, in Examples 1 to 7, a hole is less likely to be unintentionally formed in the color filters 29R, 29G, 29B and difference in the widths of the light blocking portions 40 is less likely to be caused. Therefore, display unevenness is less likely to be recognized. In each of Examples 1, 2, 5, 7, an undercut occurs in the light blocking portion 40; however, the dimension of the undercut is smaller than the undercut in the light blocking portion of Comparative Example 1. Therefore, the repulsion of the material of the color filters 29R, 29G, 29B is effectively suppressed and the heat dissipation ability from the second reflective film 44 to the first transmissive film 41 was effectively lowered. On the other hand, in Examples 3, 4, 6, the second reflective film 44 does not include the fifth side surface 44D (no undercut occurs). Even in such a configuration, display unevenness is effectively suppressed.

As previously described, the color filter substrate 20 of this embodiment includes the green color filter 29G (a first color filter), the blue color filter 29B (a second color filter) that exhibits a color different from a color exhibited by the green color filter 29G, and the light blocking portion 40 that is disposed at a border between the green color filter 29G and the blue color filter 29B and in a lower layer than the green color filter 29G and the blue color filter 29B. The light blocking portion 40 includes the first transmissive film 41, the first reflective film 42 that is included in an upper layer than the first transmissive film 41, the second transmissive film 43 that is included in an upper layer than the first reflective film 42, and the second reflective film 44 that is included in an upper layer than the second transmissive film 43 and has a thickness greater than a thickness of the first reflective film 42. The first transmissive film 41 includes the first bottom surface 41A on an opposite side from the first reflective film 42 and the first side surface 41B. The first angle θ1, which is an acute angle, is formed between the first side surface 41B and the first bottom surface 41A. The second reflective film 44 includes the second bottom surface 44A that is contacted with the upper surface 43C of the second transmissive film 43 and extends parallel to the first bottom surface 41A, and the second side surface 44B that is inclined at the second angle θ2, which is an acute angle, with respect to the second bottom surface 44A.

The light that is to travel between the green color filter 29G and the blue color filter 29B is blocked by the light blocking portion 40 that is disposed at the border between the green color filter 29G and the blue color filter 29B. Accordingly, mixing of the colors is less likely to be caused.

The external light that enters the light blocking portion 40 from a lower layer side passes through the first transmissive film 41 and then reaches the first reflective film 42. The first reflective film 42, which has a thickness smaller than that of the second reflective film 44, does not reflect all the light rays but reflects some of the light rays and transmits some of the light rays. The light rays that pass through the first reflective film 42 pass through the second transmissive film 43 and reach the second reflective film 44. The second reflective film 44, which has a thickness greater than that of the first reflective film 42, reflects almost all the light rays that reach the second reflective film 44. The light rays that are reflected by the first reflective film 42 and the light rays that are reflected by the second reflective film 44 cancel each other to some extent based on the conditions for interference according to the refractive index and the thickness of each of the first transmissive film 41 and the second transmissive film 43. This suppresses reflection of external light by the light blocking portion 40. Some of the reflected light rays reflected by the second reflective film 44 are reflected again by the first reflective film 42 to return to the second reflective film 44. Accordingly, the light rays are less likely to exit the first transmissive film 41 toward the lower layer side.

As previously described, the light blocking portion 40 has a multilayer structure including the first transmissive film 41, the first reflective film 42, the second transmissive film 43, and the second reflective film 44. Therefore, the exposure precision of the exposing device, which is used in patterning the light blocking portion 40 in the producing process, can be effectively increased compared to processing a light blocking portion made of resin material. Accordingly, the light blocking portion 40 can be preferably miniaturized. Furthermore, the first angle θ1, which is an acute angle, is formed between the first side surface 41B and the first bottom surface 41A of the first transmissive film 41, and the second side surface 44B of the second reflective film 44 is inclined at the second angle θ2, which is an acute angle, with respect to the second bottom surface 44A. Therefore, compared to a configuration in which an obtuse angle is formed between the first side surface and the first bottom surface 41A and an obtuse angle is formed between the second side surface and the second bottom surface 44A, the wettability of the material of the color filters 29G, 29B near the light blocking portion 40 is improved when the color filters 29G, 29B are formed in the producing process. Therefore, the repulsion of the material of the color filters 29G, 29B is less likely to be caused near the light blocking portion 40 and therefore, a hole is less likely to be unintentionally formed in the color filters 29G, 29B.

The first reflective film 42 includes the third bottom surface 42A, which is contacted with the upper surface 41C of the first transmissive film 41 and extends parallel to the first bottom surface 41A, and the third side surface 42B. The third angle θ3 is formed between the third side surface 42B and the third bottom surface 42A. The second transmissive film 43 includes the fourth bottom surface 43A, which is contacted with the upper surface 42C of the first reflective film 42 and extends parallel to the first bottom surface 41A, and the fourth side surface 43B. The fourth angle θ4 is formed between the fourth side surface 43B and the fourth bottom surface 43A. The first reflective film 42 is configured such that the third side surface 42B is not contacted with the first side surface 41B but is contacted with the upper surface 41C of the first transmissive film 41. Thus, the third side surface 42B is disposed inward with respect to the first side surface 41B. Therefore, the heat dissipation ability from the first reflective film 42 to the first transmissive film 41 is lowered. Therefore, with the etching device 50 being used for patterning the light blocking portion 40 and the color filter substrate 20 being supported by the substrate support base 52 including the protrusions 52A that are arranged at intervals, difference in the heat dissipation ability is less likely to be caused between the contact portions of the color filter substrate 20 that are contacted with the protrusions 52A and the non-contact portions that are not contacted with the protrusions 52A. Accordingly, the obtained light blocking portions 40 can be equalized and the amounts of light rays passing through the color filters 29G, 29B can be equalized.

The light blocking portion 40 is configured such that the third angle θ3 and the fourth angle θ4 are greater than the first angle θ1. With such a configuration, the heat dissipation ability from the first reflective film 42 to the first transmissive film 41 is further lowered compared to a configuration in which the third angle and the fourth angle are same as or smaller than the first angle θ1. Accordingly, the obtained light blocking portions 40 are equalized.

The second reflective film 44 includes the fifth side surface 44D. The fifth angle θ5, which is an obtuse angle, is formed between the fifth side surface 44D and the second bottom surface 44A. The fifth side surface 44D is contacted with (continuous to) the second bottom surface 44A. A portion of the second reflective film 44, which includes the fifth side surface 44D, protrudes outward with respect to the second transmissive film 43. The heat dissipation ability from the second reflective film 44 to the second transmissive film 43 is lowered compared to the heat dissipation ability with a configuration in which the second reflective film does not include the fifth side surface 44D. This further equalizes the obtained light blocking portions 40.

The light blocking portion 40 is configured such that the sixth angle θ6 is formed between the line segment LS, which extends from the outer edge 41D of the first transmissive film 41 to the outer edge 44E of the second reflective film 44, and the first bottom surface 41A and the sixth angle θ6 is from 70° to 90°. The sixth angle θ6 that is formed between the line segment LS and the first bottom surface 41A is 90° or smaller. Therefore, compared to the configuration in which the sixth angle is greater than 90°, the wettability of the material of the color filters 29G, 29B is improved near the light blocking portion 40 when forming the color filters 29G, 29B in the producing process. With such a configuration, repulsion of the material of the color filters 29G, 29B is less likely to be caused near the light blocking portion 40. Therefore, a hole is further less likely to be formed unintentionally in the color filters 29G, 29B. On the other hand, the sixth angle θ6 that is formed between the line segment LS and the first bottom surface 41A is 70° or greater. Therefore, compared to the configuration in which the sixth angle is smaller than 70°, the heat dissipation ability from the second reflective film 44 to the first transmissive film 41 is lowered. Therefore, in the producing process, with the etching device 50 being used for patterning the light blocking portion 40 and the color filter substrate 20 being supported by the substrate support base 52 including the protrusions 52A that are arranged at intervals, difference in the heat dissipation ability is less likely to be caused between the contact portions of the color filter substrate 20 that are contacted with the protrusions 52A and the non-contact portions that are not contacted with the protrusions 52A. Accordingly, the obtained light blocking portions 40 can be equalized and the amounts of light rays passing through the color filters 29G, 29B can be equalized.

The liquid crystal display device 10 (the display device) of this embodiment includes the color filter substrate 20 described above and the array substrate 21 that is disposed opposite the color filter substrate 20. According to such a liquid crystal display device 10, miniaturization of the light blocking portions 40 included in the color filter substrate 20 are achieved and high precision of the display image can be preferably achieved.

The method of producing the color filter substrate 20 of this embodiment includes depositing the first transmissive film 41 on the glass substrate 20GS (the substrate), depositing the first reflective film 42 on an upper layer side of the first transmissive film 41, depositing the second transmissive film 43 on an upper layer side of the first reflective film 42, depositing the second reflective film 44, which has a thickness greater than a thickness of the first reflective film 42, on an upper layer side of the second transmissive film 43, depositing the resist film R having photosensitive properties on an upper layer side of the second reflective film 44, exposing the resist film R with light and performing development. The method further includes performing the first etching in which at least the second reflective film 44 is subjected to etching with using the resist film R as a mask, and performing the second etching in which the second reflective film 44, the second transmissive film 43, the first reflective film 42, and the first transmissive film 41 are subjected to etching with using the resist film R as a mask at the etching speed that is lower than the etching speed of the first etching. By performing the first etching and the second etching, the light blocking portion 40 including the first transmissive film 41, the first reflective film 42, the second transmissive film 43, and the second reflective film 44 is formed. The method further includes forming the green color filter 29G edge portions of which are disposed on an upper layer side of the light blocking portion 40, and forming the blue color filter 29B that exhibits a color different from a color exhibited by the green color filter 29G and is disposed next to the green color filter 29G and edge portions of which are disposed on an upper layer side of the light blocking portion 40.

After sequentially depositing the first transmissive film 41, the first reflective film 42, the second transmissive film 43, the second reflective film 44, and the resist film R, the resist film R is exposed with light and development is performed. After performing the first etching through the patterned resist film R, the uncovered portion of at least the second reflective film 44 that is not covered by the resist film R is removed. Subsequently, after performing the second etching through the resist film R, the uncovered portions of the second reflective film 44, the second transmissive film 43, the first reflective film 42, and the first transmissive film 41 that are not covered by the resist film R are removed and the light blocking portion 40 is formed. Thereafter, after the green color filter 29G and the blue color filter 29B are formed, the light blocking portion 40 is disposed at the border between the green color filter 29G and the blue color filter 29B.

The first etching and the second etching will be described in detail. With the first etching, in which the etching speed is higher than the etching speed in the second etching, being performed first, the second reflective film 44 is processed such that the side surfaces of the second reflective film 44 extend to form a large angle that is close to 90° with respect to the bottom surface. Subsequently, with the second etching in which the etching speed is lower than the etching speed in the first etching being performed, the second reflective film 44, the second transmissive film 43, the first reflective film 42, and the first transmissive film 41 are etched with the resist film R being gradually etched. As a result, the second reflective film 44, the second transmissive film 43, the first reflective film 42, and the first transmissive film 41 are processed such that the angles formed between the side surfaces 41B-44B and the bottom surfaces 41A-41A, respectively, are smaller than the corresponding angles formed with only the first etching being performed and without performing the second etching. Accordingly, at least the first angle $\theta 1$, at which the first side surface 41B (a side surface) of the first transmissive film 41 is inclined with respect to the first bottom surface 41A (a bottom surface), and the second angle $\theta 2$, at which the second side surface 44B (a side surface) of the second reflective film 44 is inclined with respect to the second bottom surface 44A (a bottom angle), are acute angles. Compared to the configuration obtained by performing only the first etching, the first transmissive film 41 and the second transmissive film 43 are less likely to be etched and a large undercut is less likely to occur in the light blocking portion 40.

The light blocking portion 40, which is formed as previously described, has a multilayer structure including the first transmissive film 41, the first reflective film 42, the second transmissive film 43, and the second reflective film 44. Therefore, the exposure precision of the exposing device, which is used in patterning the light blocking portion 40 in the producing process, can be effectively increased compared to processing a light blocking portion made of resin material. Accordingly, the light blocking portion 40 can be preferably miniaturized. Furthermore, at least the first angle $\theta 1$, which is formed between the first side surface 41B (the side surface) and the first bottom surface 41A (the bottom surface) of the first transmissive film 41, and the second angle $\theta 2$ at which the second side surface 44B (the side surface) of the second reflective film 44 is inclined with respect to the second bottom surface 44A (the bottom surface) are acute angles. Compared to the configuration in which a first angle, which is formed between a first side surface and the first bottom surface 41A of the first transmissive film 41, and a second angle at which a second side surface is inclined with respect to the second bottom surface 44A of the second reflective film 44 are obtuse angles, the wettability of the material of the color filters 29G, 29B near the light blocking portion 40 is improved when the color filters 29G, 29B are formed in the producing process. Therefore, the material of the color filters 29G, 29B is less likely to be repelled near the light blocking portion 40 and a hole is less likely to be unintentionally formed in the color filters 29G, 29B.

At least $SF_6$ gas is used in the first etching and at least $CF_4$ gas and $O_2$ gas are used in the second etching. By using at least $SF_6$ gas in the first etching and using at least $CF_4$ gas and $O_2$ gas in the second etching, the etching speed in the first etching is increased and the etching speed in the second etching is decreased.

The etching device 50 is used in the first etching and the second etching. The etching device 50 includes the vacuum chamber 51 in which the glass substrate 20GS is arranged and the substrate support base 52 that is arranged in the vacuum chamber 51. The substrate support base 52 includes the protrusions 52A that are arranged at intervals within a surface area of the glass substrate 20GS and support the glass substrate 20GS. In performing the first etching and the second etching, the glass substrate 20GS arranged in the vacuum chamber 51 of the etching device 50 is supported by the protrusions 52A of the substrate support base 52. The contact area of the substrate support base 52 contacted with the glass substrate 20GS is smaller compared to the contact area of a substrate support base that is surface-contacted with the surface of the glass substrate 20GS. With such a configuration, even if the material of the first reflective film 42 and the second reflective film 44 scatters due to performing of the first etching and the second etching and adheres to the surface of the substrate support base 52, etching errors are less likely to be caused by the material adhering to the substrate support base 52. On the other hand, the glass substrate 20GS includes contact portions that are contacted with the protrusions 52A and non-contact portions that are not contacted with the protrusions 52A. Therefore, the glass substrate 20GS may have different heat dissipation ability in the contact portions and the non-contact portions. In this respect, the second etching in which the etching speed is lower than that in the first etching is performed after the first etching in which the etching speed is higher than that in the second etching is performed. Therefore, the angle that is formed between the side surface and the bottom surface of the first transmissive film 41, and the angle that is formed between the side surface and the bottom surface of the second reflective film 44 are increased compared to those obtained by performing only the second etching. Therefore, heat dissipation ability from the second reflective film 44 to the first transmissive film 41 is lowered and this can reduce the difference in the heat dissipation ability between the contact portions of the glass substrate 20GS that are contacted with the protrusions 52A and the non-contact portions that are not contacted with the protrusions 52A. Accordingly, the obtained light blocking portions 40 can be equalized and the amounts of light rays passing through the color filters 29G, 29B can be equalized.

Other Embodiments

The technology described herein is not limited to the embodiments described above and illustrated by the drawings. For example, the following embodiments will be included in the technical scope of the present technology.

(1) The specific angles of the first angle θ1 to the sixth angle θ6 of the light blocking portion 40 may be altered from those described above. The sixth angle θ6 is preferably from 70° to 90° but may not be limited thereto.

(2) Other than the configurations illustrated in FIGS. 7 and 8, the light blocking portion 40 may be configured such that the second reflective film 44 does not have the fifth side surface 44D (no undercut) like Examples 3, 4, 6 of Comparative Experiment 1. Namely, the first reflective film 42 may be configured such that the third side surface 42B is contacted with the first side surface 41B.

(3) Other than the configurations illustrated in FIGS. 7 and 8, the light blocking portion 40 may be configured such that the third angle θ3 and the fourth angle θ4 may be 90° or greater. In such a configuration, the third side surface 42B of the first reflective film 42 and the fourth side surface 43B of the second transmissive film 43 may extend parallel to the fifth side surface 44D but may cross the fifth side surface 44D.

(4) The material of the reflective films 42, 44 of the light blocking portion 40 may be molybdenum (Mo), molybdenum tungsten (MoW) which is an alloy of Mo and W, aluminum (Al), and copper (Cu).

(5) The light transmissive resin material of the transmissive films 41, 43 of the light blocking portion 40 may be $SiO_2$ (silicon dioxide).

(6) The material of the transmissive films 41, 43 of the light blocking portion 40 may not be insulating material and may be transparent electrode material such as indium tin oxide (ITO).

(7) The specific thickness of each of the films 41 to 44 of the light blocking portion 40 may be altered as appropriate.

(8) The specific refractive index of the material of each of the transmissive films 41, 43 may be altered as appropriate.

(9) The first transmissive film 41 of the light blocking portion 40 may be thinner than the second transmissive film 43. The first transmissive film 41 and the second transmissive film 43 may have a same thickness with having different refractive indexes.

(10) An additional layer may be disposed between the glass substrate 20GS of the color filter substrate 20 and the first transmissive film 41 of the light blocking portion 40. Namely, the first bottom surface 41A of the first transmissive film 41 may not be directly contacted with the inner surface of the glass substrate 20GS.

(11) The specific etching gas used in the first etching and the second etching may be altered from the above described ones as appropriate.

(12) The substrate support base 52 of the etching device 50 may not include the protrusions 52A but may have a flat surface that is opposite the glass substrate 20GS. In such a configuration, if some obstacle adheres to the surface of the substrate support base 52, the glass substrate 20GS includes a contact portion that is contacted with the obstacle and a non-contact portion that is not contacted with the obstacle. This causes difference in the heat dissipation ability. Therefore, difference in the widths of the light blocking portions 40 is caused and display unevenness corresponding to the obstacle may be recognized. However, such a problem is less likely to be caused. The substrate support base 52 may have slits (grooves) formed in a grid on the surface that is opposite the glass substrate 20GS. The slits are to be filled with cooling gas (helium (He) gas, for example). In such a configuration, the glass substrate 20GS may include contact portions that are contacted with the surface of the substrate support base 52 and non-contact portions that are not contacted with the surface of the substrate support base 52. This causes difference in the heat dissipation ability. Therefore, difference in the widths of the light blocking portions 40 is caused and display unevenness corresponding to the slits may be recognized. However, such a problem is less likely to be caused.

(13) The etching device 50 may be a dry etching device of an etching method other than the inductively coupled plasma (ICP) etching method.

(14) The light blocking portion 40 may be formed in a grid in a plan view so as to overlap both of the gate line 25 and the source line 26.

(15) The color filter substrate 20 may include an overcoat film for planarization.

(16) The number of colors of the color filters 29 may be four or more. A yellow filter that exhibits yellow or a transparent color filter through which light in all wavelength region can pass may be additionally included.

(17) A source driver may be disposed on the array substrate 21 instead of the first circuit 14A.

(18) A source driver may be disposed on the flexible board 13 instead of the first circuit 14A.

(19) A gate driver may be disposed on the array substrate 21 instead of the second circuit 14B.

(20) With respect to the pixel electrodes 28 and the common electrode 30, the pixel electrodes 28 may be defined as the upper electrode that is included in an upper layer and the common electrode 30 may be defined as the lower electrode that is included in a lower layer. In such a configuration, the pixel electrodes 28, which are defined as the upper electrode, include slits.

(21) The operation mode of the liquid crystal panel 11 may not be the FFS mode but may be the VA mode or the IPS mode.

(22) The liquid crystal panel 11 may not be a transmissive type but may be a reflective type or a semi-transmissive type. With the liquid crystal panel 11 being a reflective type, the backlight 12 is not necessary.

(23) Other than the head-mounted display 10HMD, a head-up display or a projector may be used as a device for magnifying images displayed on the liquid crystal panel 11 using a lens. The present technology may be applied to a display device without having a magnifying display function (such as television devices, tablet-type terminals, and smartphones).

The invention claimed is:

1. A color filter substrate comprising:
a first color filter;
a second color filter exhibiting a color different from a color exhibited by the first color filter; and
a light blocking portion disposed on a border between the first color filter and the second color filter and on a lower layer side of the first color filter and the second color filter, the light blocking portion including
a first transmissive film,
a first reflective film disposed on an upper layer side of the first transmissive film,
a second transmissive film disposed on an upper layer side of the first reflective film, and
a second reflective film disposed on an upper layer side of the second transmissive film and having a thickness greater than a thickness of the first reflective film, wherein
the first transmissive film includes a first bottom surface that is on an opposite side from the first reflective film and a first side surface that is inclined at a first angle with respect to the first bottom surface,
the second reflective film includes a second bottom surface that is contacted with an upper surface of the second transmissive film and extends parallel to the first bottom surface and a second side surface that is inclined at a second angle with respect to the second bottom surface, and
the first angle and the second angle are acute angles.

2. The color filter substrate according to claim 1, wherein the first reflective film includes a third bottom surface that is contacted with an upper surface of the first transmissive film and extends parallel to the first bottom surface and a third side surface, and a third angle is formed between the third side surface and the third bottom surface,
the second transmissive film includes a fourth bottom surface that is contacted with an upper surface of the first reflective film and extends parallel to the first bottom surface and a fourth side surface, and a fourth angle is formed between the fourth side surface and the fourth bottom surface, and
the first reflective film is configured such that the third side surface is contacted with the upper surface of the first transmissive film without being contacted with the first side surface.

3. The color filter substrate according to claim 2, wherein the third angle and the fourth angle are greater than the first angle.

4. The color filter substrate according to claim 2, wherein the second reflective film includes a fifth side surface that is contacted with the second bottom surface and a fifth angle is formed between the fifth side surface and the second bottom surface, and
the fifth angle is an obtuse angle.

5. The color filter substrate according to claim 1, wherein the light blocking portion is configured such that an angle formed between the first bottom surface and a line segment that extends from an outer edge of the first transmissive film to an outer edge of the second reflective film is from 70° to 90°.

6. A display device comprising:
the color filter substrate according to claim 1; and
an array substrate disposed to opposite the color filter substrate.

7. A method of producing a color filter substrate, the method comprising:
depositing a first transmissive film on a substrate;
depositing a first reflective film on an upper layer side of the first transmissive film;
depositing a second transmissive film on an upper layer side of the first reflective film;
depositing a second reflective film on an upper layer side of the second transmissive film, the second reflective film being thicker than the first reflective film;
depositing a resist film having photosensitive properties on an upper layer side of the second reflective film;
exposing the resist film with light to perform development;
performing first etching in which at least the second reflective film is subjected to etching with using the resist film as a mask;
performing second etching in which the second reflective film, the second transmissive film, the first reflective film, and the first transmissive film are subjected to etching with using the resist film as a mask at an etching speed that is lower than an etching speed of the first etching, whereby forming a light blocking portion including the first transmissive film, the first reflective film, the second transmissive film, and the second reflective film;
forming a first color filter such that an edge portion of the first color filter is disposed on an upper layer side of the light blocking portion; and
forming a second color filter next to the first color filter such that an edge portion of the second color filter is disposed on an upper layer side of the light blocking portion, the second color filter exhibiting a color different from a color that is exhibited by the first color filter.

8. The method according to claim 7, wherein
in the first etching, at least $SF_6$ gas is used, and
in the second etching, at least $CF_4$ gas and $O_2$ gas are used.

9. The method according to claim 7, wherein
in the first etching and the second etching, an etching device is used, the etching device including
a vacuum chamber in which the substrate is arranged, and
a substrate support base arranged in the vacuum chamber and including protrusions that are arranged at intervals within a surface area of the substrate and support the substrate.

\* \* \* \* \*